(12) United States Patent
Kurasawa et al.

(10) Patent No.: US 10,642,434 B2
(45) Date of Patent: *May 5, 2020

(54) SENSOR DEVICE AND SENSOR-EQUIPPED DISPLAY DEVICE

(71) Applicant: Japan Display Inc., Tokyo (JP)

(72) Inventors: Hayato Kurasawa, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/280,709

(22) Filed: Feb. 20, 2019

(65) Prior Publication Data

US 2019/0179457 A1 Jun. 13, 2019

Related U.S. Application Data

(63) Continuation of application No. 15/953,633, filed on Apr. 16, 2018, now Pat. No. 10,248,275, which is a
(Continued)

(30) Foreign Application Priority Data

Jun. 10, 2014 (JP) .................................. 2014-119629

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04112* (2013.01)

(58) Field of Classification Search
CPC combination set(s) only.
See application file for complete search history.

(56) References Cited

U.S. PATENT DOCUMENTS

2009/0273577 A1* 11/2009 Chen ...................... G06F 3/044
345/174
2012/0044171 A1 2/2012 Lee
(Continued)

FOREIGN PATENT DOCUMENTS

| CN | 101776813 | 7/2010 |
| CN | 102193679 | 9/2011 |

(Continued)

OTHER PUBLICATIONS

Taiwan Office Action dated Jun. 15, 2016 in corresponding Taiwan Application No. 104115936.
(Continued)

*Primary Examiner* — Lauren Nguyen
(74) *Attorney, Agent, or Firm* — K&L Gates LLP

(57) ABSTRACT

A sensor-equipped display device is provided and includes a display panel and a detection electrode. The panel includes a display area in which pixels are arranged with a first pixel pitch in a first direction and a second pixel pitch in a second direction. The electrode includes an pattern having line fragments. The pattern has connection points at which ends of the fragments are connected to each other, and at least part of the connection points is arranged linearly such that an arrangement gaps thereof in the first and second direction is set to a first and second connection point pitch.

18 Claims, 21 Drawing Sheets

Related U.S. Application Data continuation of application No. 14/734,702, filed on Jun. 9, 2015, now Pat. No. 10,013,122.

(56) References Cited

U.S. PATENT DOCUMENTS

| | | |
|---|---|---|
| 2012/0242606 A1 | 9/2012 | Mackey |
| 2013/0294037 A1 | 11/2013 | Kuriki et al. |
| 2014/0035867 A1 | 2/2014 | Azumi et al. |
| 2014/0063370 A1 | 3/2014 | Ko et al. |
| 2014/0292710 A1 | 10/2014 | Koito et al. |
| 2014/0292713 A1 | 10/2014 | Koito et al. |
| 2014/0293158 A1 | 10/2014 | Kurasawa et al. |
| 2014/0320760 A1 | 10/2014 | Ishizaki et al. |

FOREIGN PATENT DOCUMENTS

| | | |
|---|---|---|
| CN | 102955635 | 3/2013 |
| CN | 103513821 | 1/2014 |
| JP | 2005-044247 | 2/2005 |
| JP | 2011-137882 | 7/2011 |
| JP | 2012-163951 | 8/2012 |
| JP | 2012-164648 | 8/2012 |
| JP | 2013-225195 | 10/2013 |
| JP | 2014-191650 | 10/2014 |
| JP | 2014-191657 | 10/2014 |
| JP | 2014-191660 | 10/2014 |
| JP | 2014-191661 | 10/2014 |
| KR | 10-1343241 | 12/2013 |
| TW | 201319889 | 5/2013 |
| TW | 201411239 | 3/2014 |
| WO | WO/2013/039050 | 3/2013 |

OTHER PUBLICATIONS

Korean Office Action dated Jun. 21, 2016 in corresponding Korean Application No. 10-2015-0080816.
Chinese Office Action dated Sep. 29, 2017, in corresponding Chinese Application No. 2014102996810.
Japanese Office Action dated Feb. 6, 2018 in corresponding Japanese Application No. 2014-119629.

\* cited by examiner

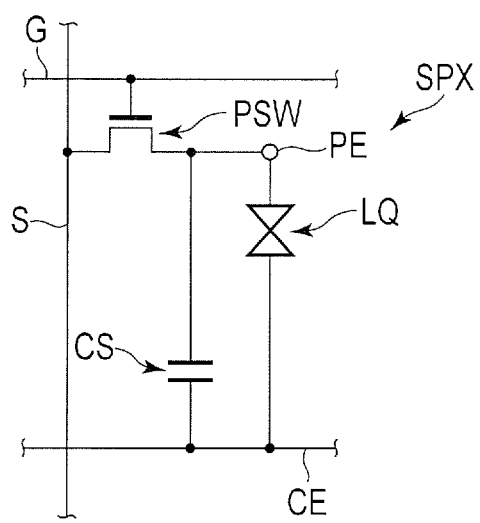
F I G. 3

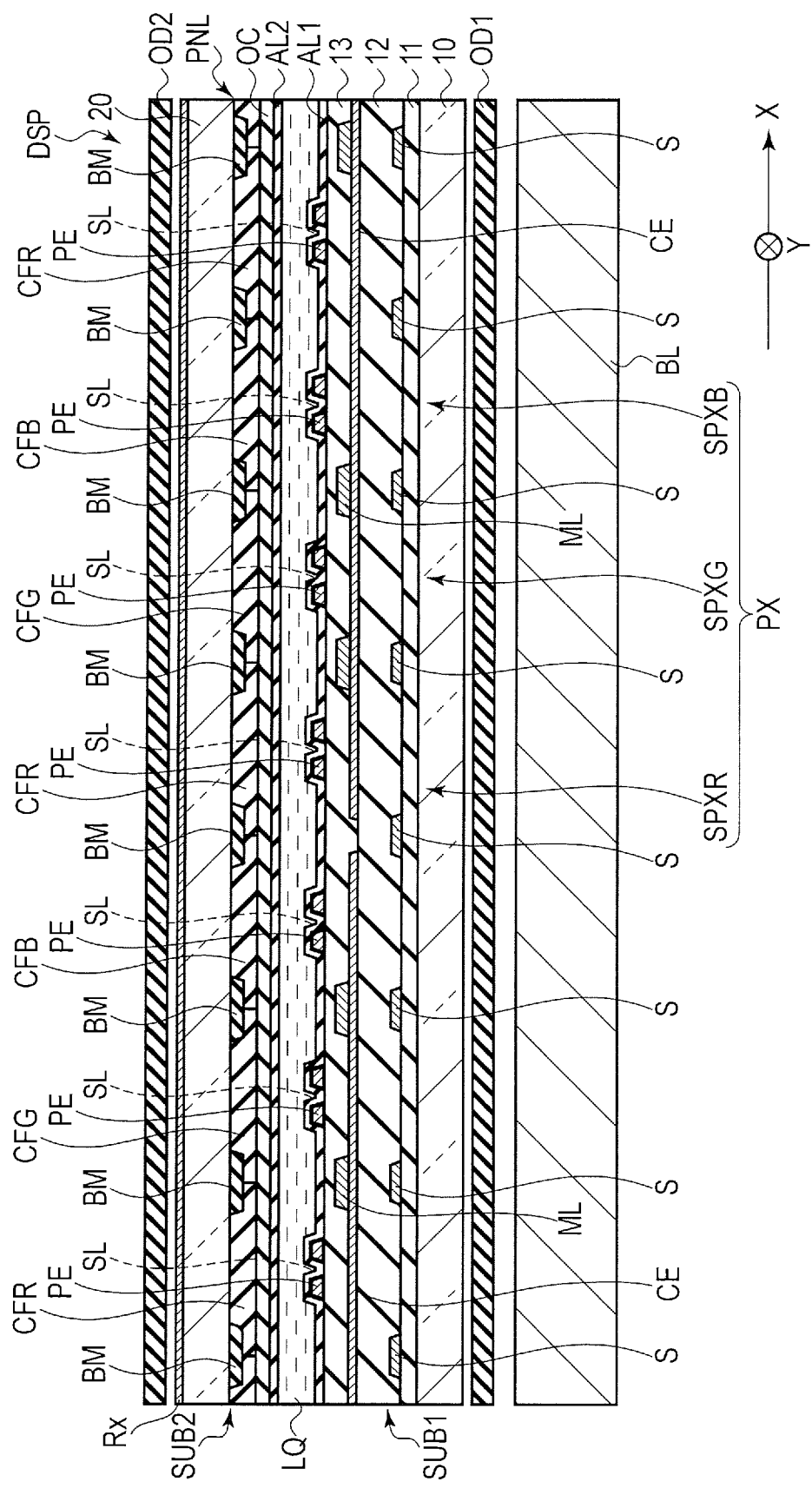
F I G. 4

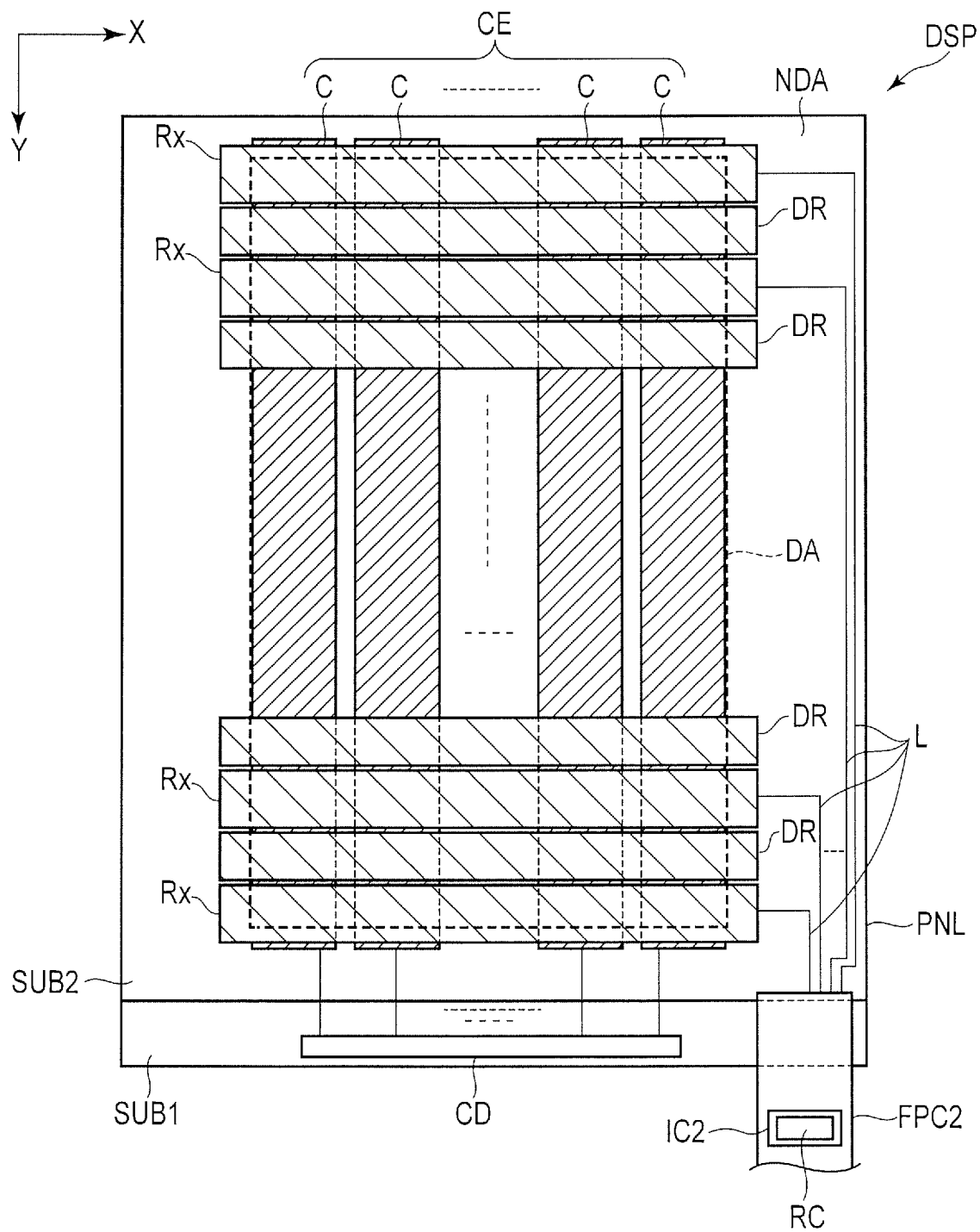
F I G. 5

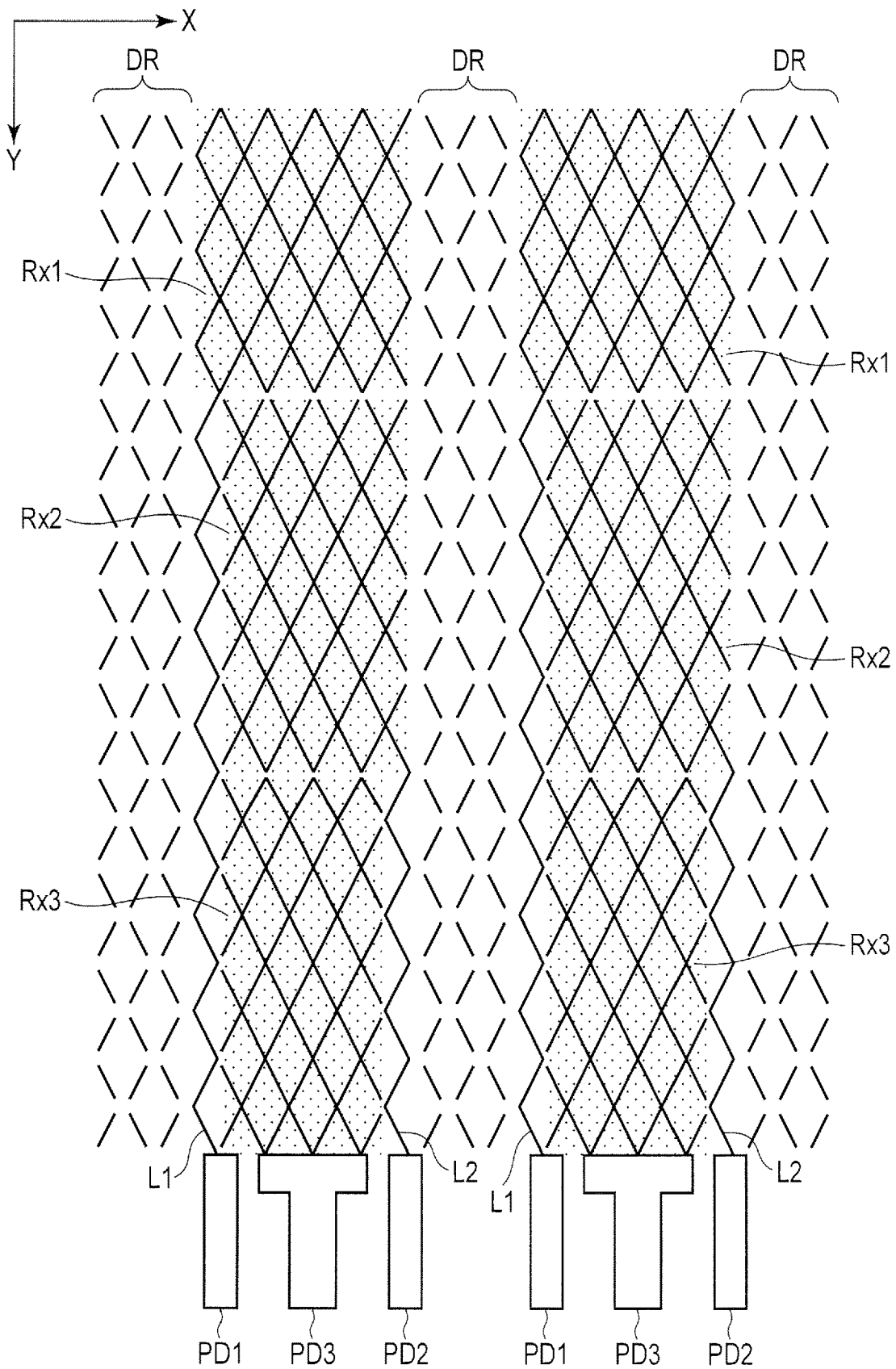
F I G. 10

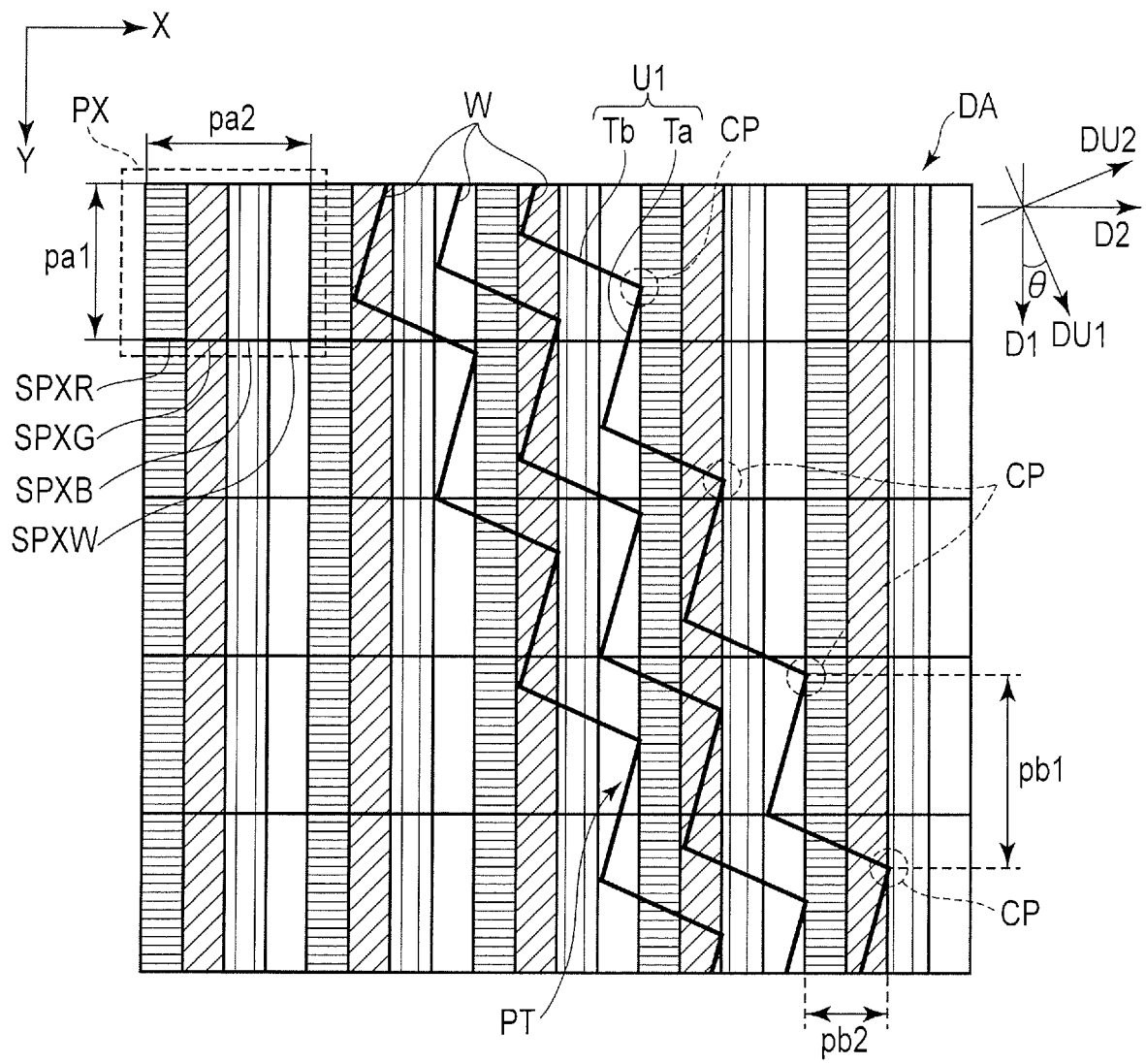
F I G. 12

|  | | | Type A pa2=58.8 μm, pa1=58.8 μm | | | Type B pa2=138 μm, pa1=103.5 μm | | |
|---|---|---|---|---|---|---|---|---|
| Evaluation example | Connection points | | | | | | | |
|  | pb1[μm] | pb2[μm] | Level | pb1/0.5pa1 | pb2/0.5pa2 | Level | pb1/0.5pa1 | pb2/0.5pa2 |
| E101 | 150 | 100 | 2 | 5.10 | 3.40 | 2 | 2.17 | 1.93 |
| E102 | 157.5 | 105 | 1 | 5.36 | 3.57 | 1 | 2.28 | 2.03 |
| E103 | 165 | 110 | 1 | 5.61 | 3.74 | 1 | 2.39 | 2.13 |
| E104 | 172.5 | 115 | 2 | 5.87 | 3.91 | 1 | 2.50 | 2.22 |
| E105 | 180 | 120 | 2 | 6.12 | 4.08 | 1 | 2.61 | 2.32 |
| E106 | 187.5 | 125 | 1 | 6.38 | 4.25 | 1 | 2.72 | 2.42 |
| E107 | 225 | 150 | 2 | 7.65 | 5.10 | 2 | 3.26 | 2.90 |
| E108 | 232.5 | 155 | 2 | 7.91 | 5.27 | 3 | 3.37 | 3.00 |
| E109 | 240 | 160 | 1 | 8.16 | 5.44 | 2 | 3.48 | 3.09 |
| E110 | 247.5 | 165 | 1 | 8.42 | 5.61 | 1 | 3.59 | 3.19 |
| E111 | 255 | 170 | 1 | 8.67 | 5.78 | 1 | 3.70 | 3.29 |
| E112 | 262.5 | 175 | 4 | 8.93 | 5.95 | 1 | 3.80 | 3.38 |
| E113 | 270 | 180 | 1 | 9.18 | 6.12 | 2 | 3.91 | 3.48 |
| E114 | 277.5 | 185 | 1 | 9.44 | 6.29 | 2 | 4.02 | 3.57 |
| E115 | 285 | 190 | 1 | 9.69 | 6.46 | 1 | 4.13 | 3.67 |
| E116 | 292.5 | 195 | 3 | 9.95 | 6.63 | 1 | 4.24 | 3.77 |
| E117 | 300 | 200 | 1 | 10.20 | 6.80 | 1 | 4.35 | 3.86 |
| E118 | 307.5 | 205 | 2 | 10.46 | 6.97 | 3 | 4.46 | 3.96 |
| E119 | 315 | 210 | 1 | 10.71 | 7.14 | 2 | 4.57 | 4.06 |
| E120 | 322.5 | 215 | 2 | 10.97 | 7.31 | 1 | 4.67 | 4.15 |
| E121 | 330 | 220 | 1 | 11.22 | 7.48 | 1 | 4.78 | 4.25 |
| E122 | 337.5 | 225 | 1 | 11.48 | 7.65 | 1 | 4.89 | 4.35 |
| E123 | 345 | 230 | 1 | 11.73 | 7.82 | 3 | 5.00 | 4.44 |
| E124 | 352.5 | 235 | 4 | 11.99 | 7.99 | 3 | 5.11 | 4.54 |

$\theta = 33.69°$

FIG. 13

$\theta = 38.00°$

| Evaluation example | Connection points | | Type A pa1=58.8μm, pa2=58.8μm | | | Type B pa1=103.5μm, pa2=138μm | | |
|---|---|---|---|---|---|---|---|---|
| | pb1[μm] | pb2[μm] | Level | pb1/0.5pa1 | pb2/0.5pa2 | Level | pb1/0.5pa1 | pb2/0.5pa2 |
| E201 | 128 | 100 | 1 | 4.35 | 3.40 | 2 | 1.86 | 1.93 |
| E202 | 134.5 | 105 | 1 | 4.57 | 3.57 | 3 | 1.95 | 2.03 |
| E203 | 140.75 | 110 | 1 | 4.79 | 3.74 | 3 | 2.04 | 2.13 |
| E204 | 147.25 | 115 | 3 | 5.01 | 3.91 | 1 | 2.13 | 2.22 |
| E205 | 153.5 | 120 | 2 | 5.22 | 4.08 | 1 | 2.22 | 2.32 |
| E206 | 160 | 125 | 1 | 5.44 | 4.25 | 1 | 2.32 | 2.42 |
| E207 | 166.5 | 130 | 1 | 5.66 | 4.42 | 1 | 2.41 | 2.51 |
| E208 | 172.75 | 135 | 1 | 5.88 | 4.59 | 1 | 2.50 | 2.61 |
| E209 | 179.25 | 140 | 2 | 6.10 | 4.76 | 1 | 2.60 | 2.71 |
| E210 | 185.5 | 145 | 2 | 6.31 | 4.93 | 1 | 2.69 | 2.80 |
| E211 | 192 | 150 | 1 | 6.53 | 5.10 | 2 | 2.78 | 2.90 |
| E212 | 198.5 | 155 | 1 | 6.75 | 5.27 | 3 | 2.88 | 3.00 |
| E213 | 204.75 | 160 | 3 | 6.96 | 5.44 | 3 | 2.97 | 3.09 |
| E214 | 211.25 | 165 | 1 | 7.19 | 5.61 | 2 | 3.06 | 3.19 |
| E215 | 217.5 | 170 | 1 | 7.40 | 5.78 | 1 | 3.15 | 3.29 |
| E216 | 224 | 175 | 3 | 7.62 | 5.95 | 1 | 3.25 | 3.38 |
| E217 | 230.5 | 180 | 1 | 7.84 | 6.12 | 1 | 3.34 | 3.48 |
| E218 | 236.75 | 185 | 3 | 8.05 | 6.29 | 1 | 3.43 | 3.57 |
| E219 | 243.25 | 190 | 1 | 8.27 | 6.46 | 1 | 3.53 | 3.67 |
| E220 | 249.5 | 195 | 1 | 8.49 | 6.63 | 1 | 3.62 | 3.77 |
| E221 | 281.5 | 220 | 1 | 9.57 | 7.48 | 1 | 4.08 | 4.25 |
| E222 | 288 | 225 | 1 | 9.80 | 7.65 | 1 | 4.17 | 4.35 |
| E223 | 294.5 | 230 | 3 | 10.02 | 7.82 | 1 | 4.27 | 4.44 |
| E224 | 300.75 | 235 | 3 | 10.23 | 7.99 | 1 | 4.36 | 4.54 |
| E225 | 307.25 | 240 | 1 | 10.45 | 8.16 | 1 | 4.45 | 4.64 |
| E226 | 313.5 | 245 | 1 | 10.66 | 8.33 | 1 | 4.54 | 4.73 |

F I G. 14

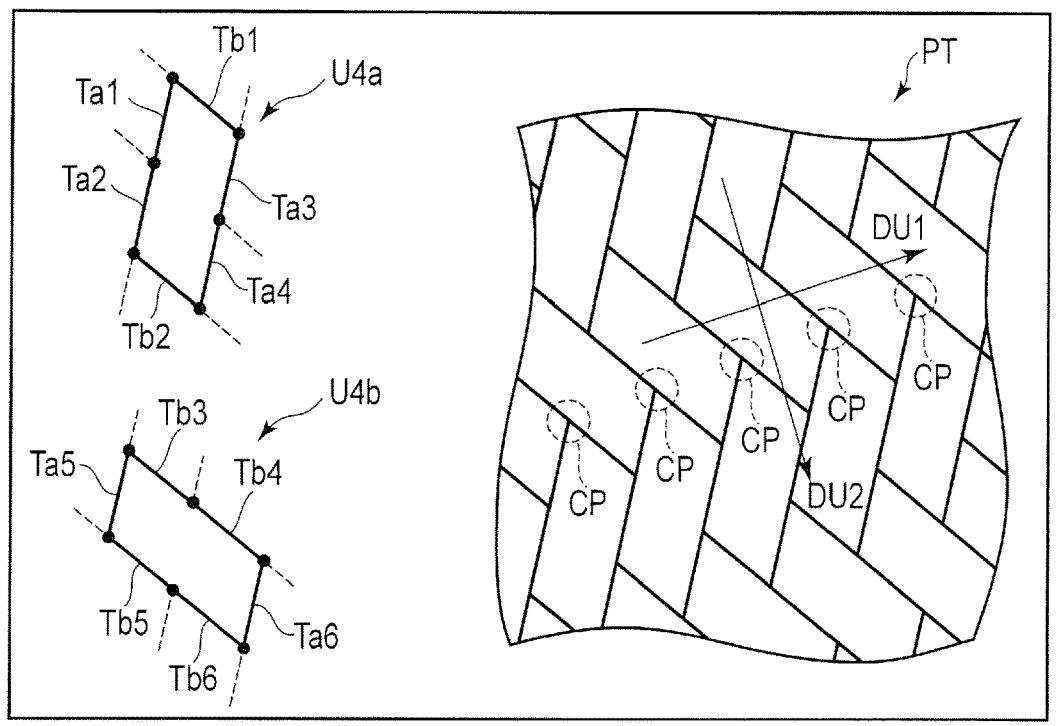
F I G. 17
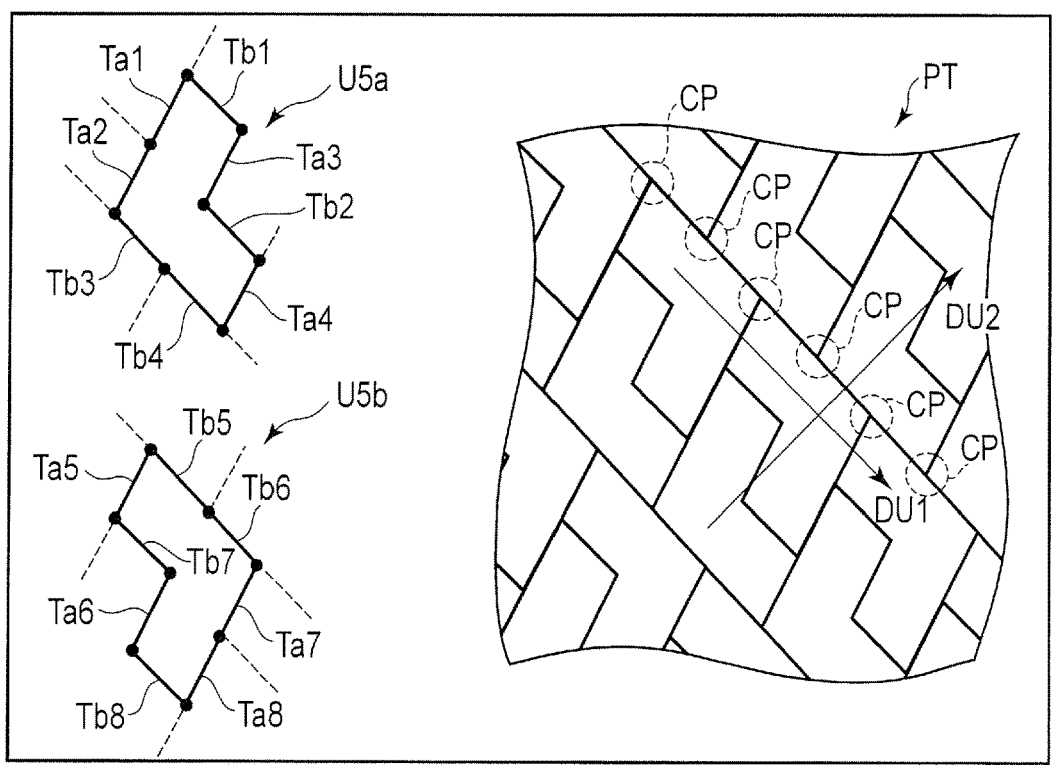
F I G. 18

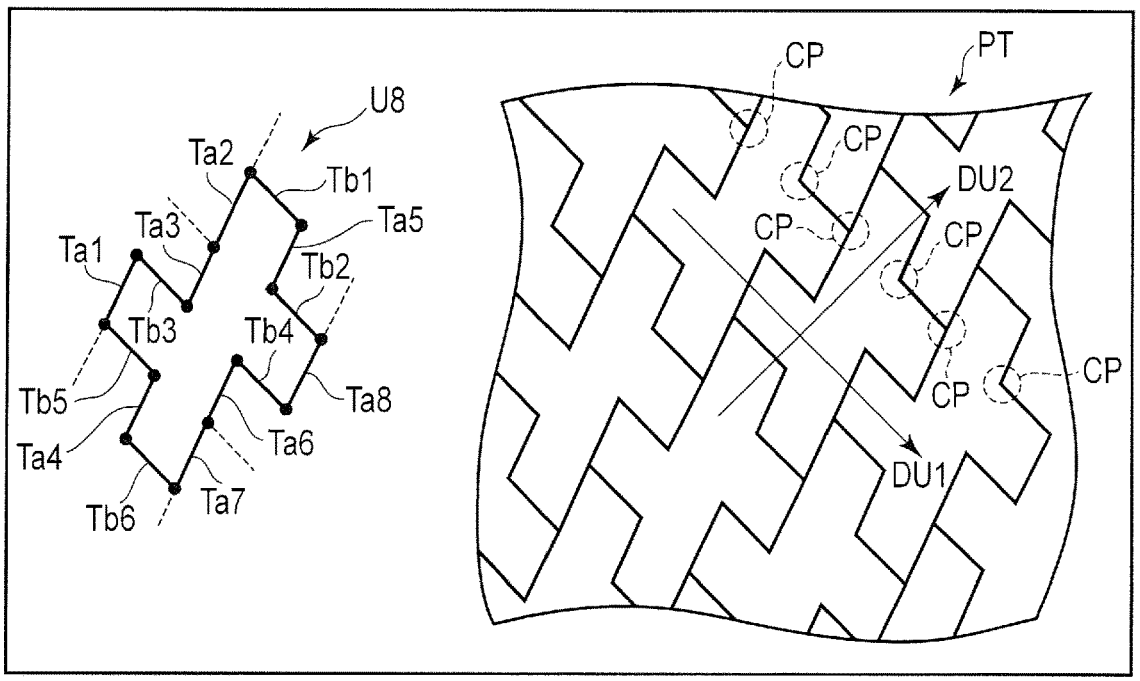
F I G. 21
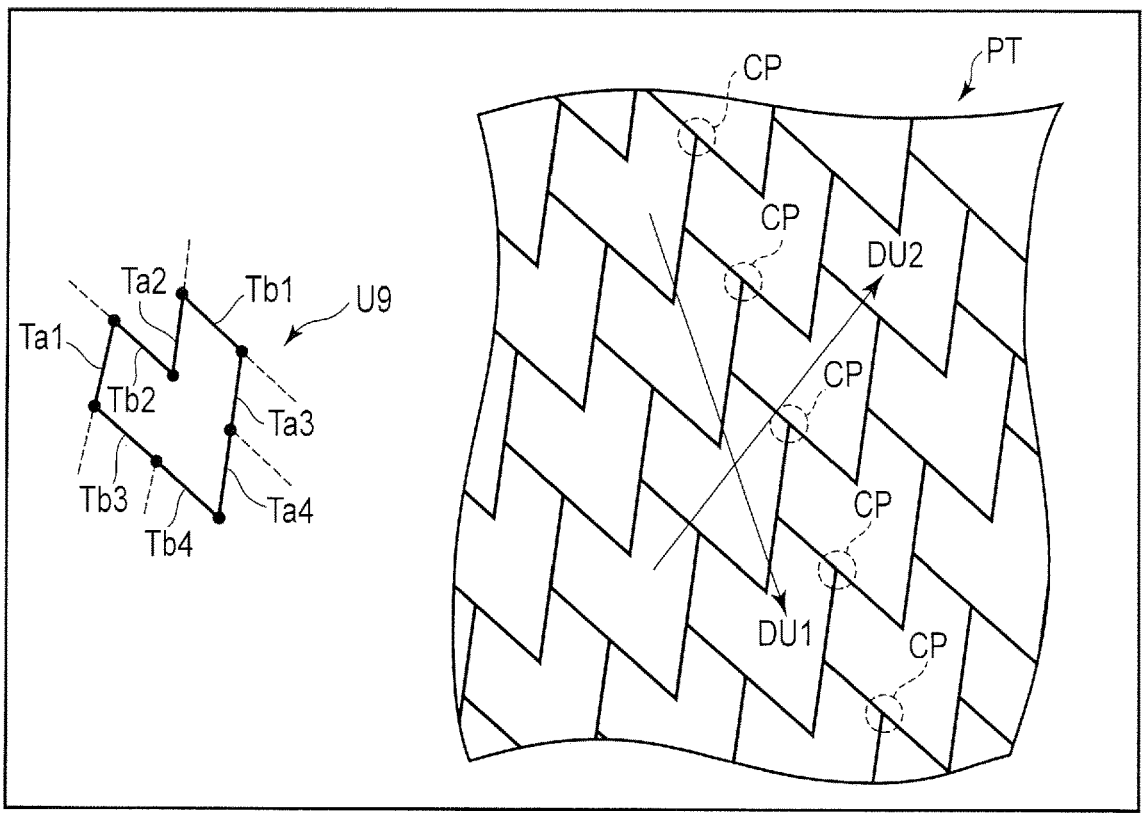
F I G. 22

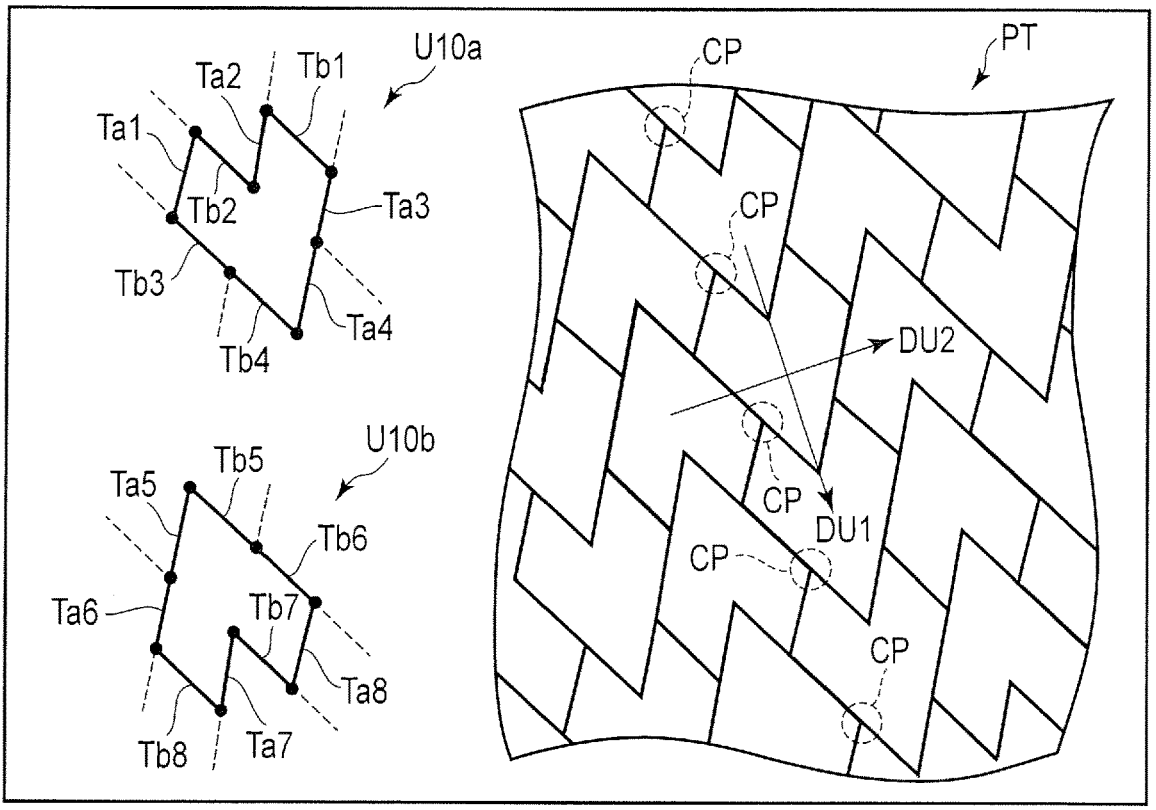
F I G. 23
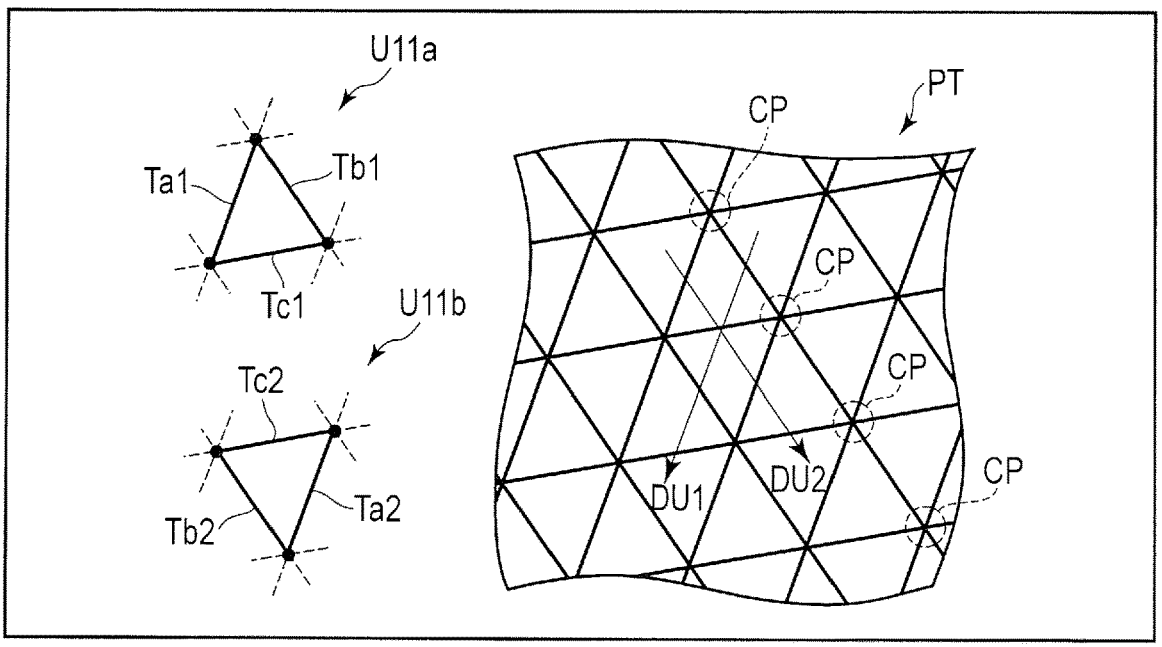
F I G. 24

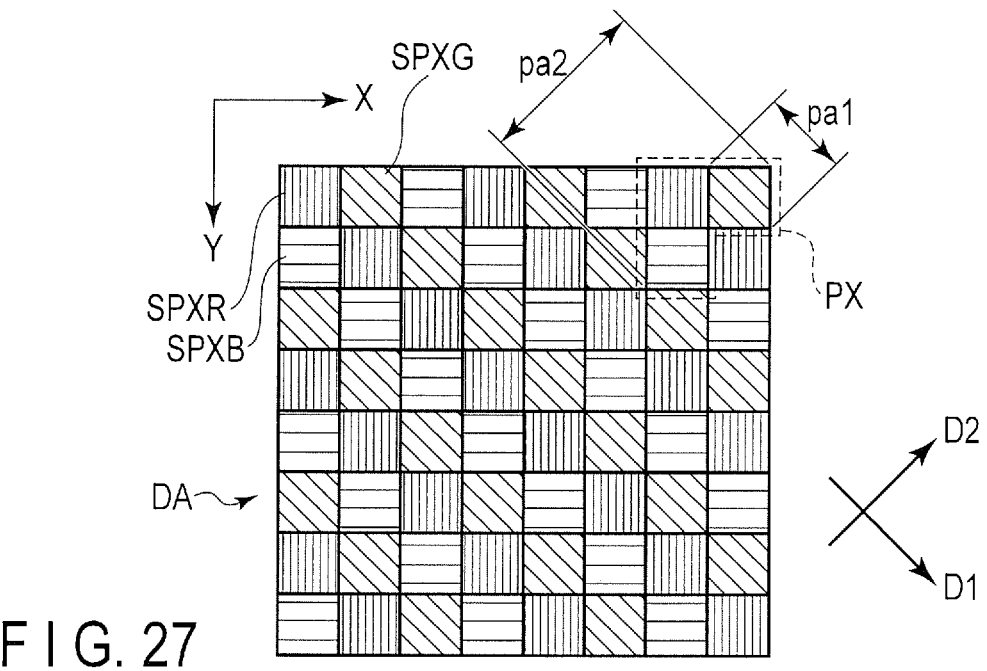
F I G. 27
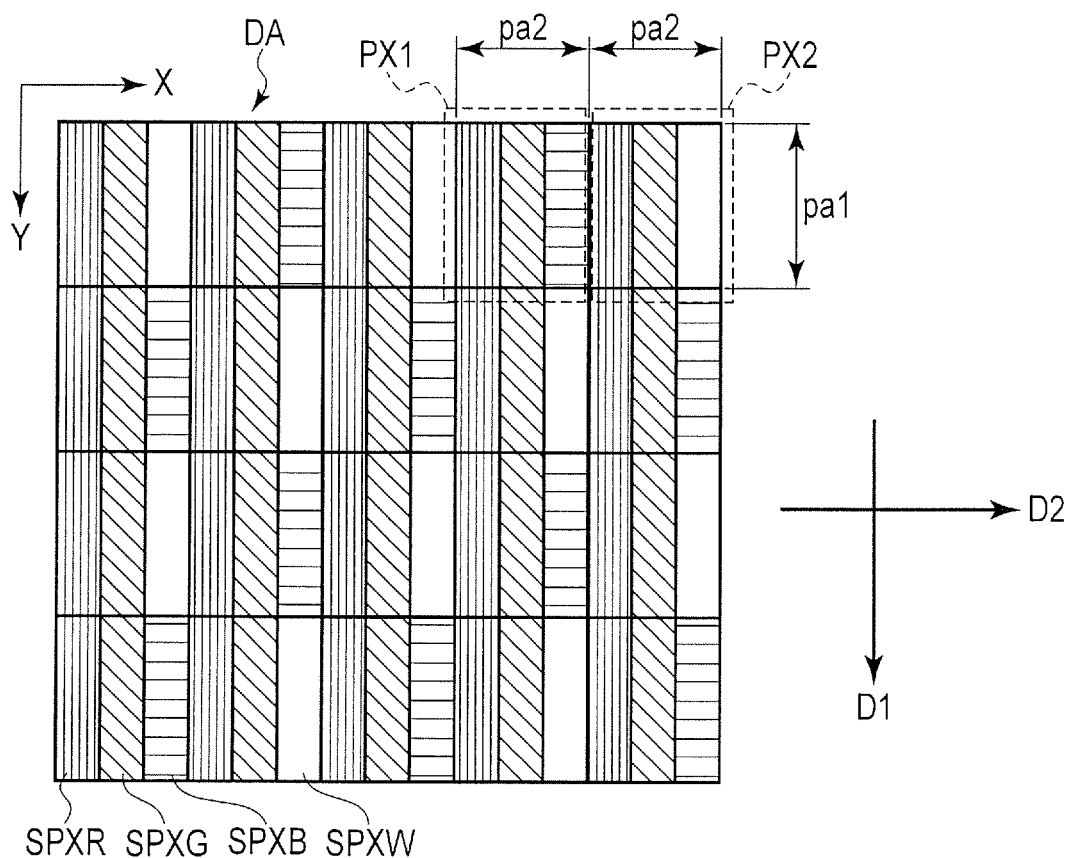
F I G. 28

SENSOR DEVICE AND SENSOR-EQUIPPED DISPLAY DEVICE

CROSS REFERENCES TO RELATED APPLICATIONS

The present application is a continuation of U.S. patent application Ser. No. 15/953,633, filed on Apr. 16, 2018, which application is a continuation of U.S. patent application Ser. No. 14/734,702, filed on Jun. 9, 2015, which application claims priority to Japanese Priority Patent Application JP 2014-119629 filed in the Japan Patent Office on Jun. 10, 2014, the entire content of which is hereby incorporated by reference.

FIELD

Embodiments described herein relate generally to a sensor-equipped display device.

BACKGROUND

Display devices including sensors which detect a contact or approach of an object are used commercially (they are often referred to as touchpanels). As an example of such sensors, there is a capacitive sensor which detects a contact or the like of an object based on a change in the capacitance between a detection electrode and a driving electrode facing each other with a dielectric interposed therebetween.

The detection electrodes and the driving electrodes are disposed to overlap with a display area to detect a contact or the like of an object therein. However, the detection electrodes and the driving electrodes disposed in such a manner and the pixels contained in the display area may generate interference which will generate moiré.

Sensor-equipped display devices which can prevent or reduce moiré are required.

SUMMARY

This application relates generally to a display device including a sensor-equipped display device.

In an embodiment, a sensor-equipped display device is provided. The sensor-equipped display device includes a display panel including a display area in which unit pixels are arranged with a first pixel pitch in a first direction and a second pixel pitch in a second direction, each of the unit pixels including a plurality of subpixels corresponding to different colors; and a detection electrode including an electrode pattern having conductive line fragments arranged on a detection surface which is parallel to the display area, the detection electrodes configured to detect a contact or approach of an object to the detection surface, wherein the electrode pattern has a plurality of connection points at which ends of the line fragments are connected to each other, and at least part of the connection points is arranged linearly such that an arrangement gap thereof in the first direction is set to a first connection point pitch and an arrangement gap thereof in the second direction is set to a second connection point pitch, the first connection point pitch is defined to exclude a range from 0.5×first pixel pitch×(integer−0.05) to 0.5×first pixel pitch×(integer+0.05), and the second connection point pitch is defined to exclude a range from 0.5×second pixel pitch×(integer−0.05) to 0.5×second pixel pitch×(integer+0.05).

Additional features and advantages are described herein, and will be apparent from the following Detailed Description and the figures.

BRIEF DESCRIPTION OF THE FIGURES

FIG. 3 is a view which schematically shows an equivalent circuit of a subpixel of the display device.

FIG. 4 is a cross-sectional view which schematically and partly shows the structure of the display device.

FIG. 5 is a plan view which schematically shows the structure of a sensor of the display device.

FIG. 10 is a view which schematically shows detection electrodes of the sensor of the display device, which are arranged in a matrix.

FIG. 12 is a view which schematically shows another arrangement example of unit pixels and electrode patterns in a display area.

FIG. 13 shows evaluation results of moiré between the electrode patterns and the display area.

FIG. 14 shows evaluation results of moiré between the electrode patterns and the display area.

FIG. 17 is a view which schematically shows part of electrode pattern of a fourth embodiment.

FIG. 18 is a view which schematically shows part of electrode pattern of a fifth embodiment.

FIG. 21 is a view which schematically shows part of electrode pattern of an eighth embodiment.

FIG. 22 is a view which schematically shows part of electrode pattern of a ninth embodiment.

FIG. 23 is a view which schematically shows part of electrode pattern of a tenth embodiment.

FIG. 24 is a view which schematically shows part of electrode pattern of an eleventh embodiment.

FIG. 27 is a view which schematically shows part of a display area of a variation 1.

FIG. 28 is a view which schematically shows part of a display area of a variation 2.

DETAILED DESCRIPTION

In general, according to one embodiment, a sensor-equipped display device comprises a display panel and a detection electrode. The display panel includes a display area in which unit pixels are arranged with a first pixel pitch in a first direction and a second pixel pitch in a second direction, each of the unit pixels including a plurality of subpixels corresponding to different colors. The detection electrode includes an electrode pattern having conductive line fragments arranged on a detection surface which is parallel to the display area. The electrode pattern has a plurality of connection points at which ends of the line fragments are connected to each other, and at least part of the connection points is arranged linearly such that an arrangement gap thereof in the first direction is set to a first connection point pitch and an arrangement gap thereof in the second direction is set to a second connection point pitch. The first connection point pitch is defined to exclude a range from 0.5×first pixel pitch×(integer−0.05) to 0.5×first pixel pitch×(integer+0.05). And the second connection point pitch is defined to exclude a range from 0.5×second pixel pitch×(integer−0.05) to 0.5×second pixel pitch×(integer+0.05).

Hereinafter, embodiments of the present application will be explained with reference to accompanying drawings.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures as compared to actual embodiments for the sake of simpler explanation, and they are not to limit the interpretation of the invention of the present application. Furthermore, in the description and Figures of the present application, structural elements having the same or similar functions will be referred to by the same reference numbers and detailed explanations of them that are considered redundant may be omitted.

(First Embodiment)

Figure 1:
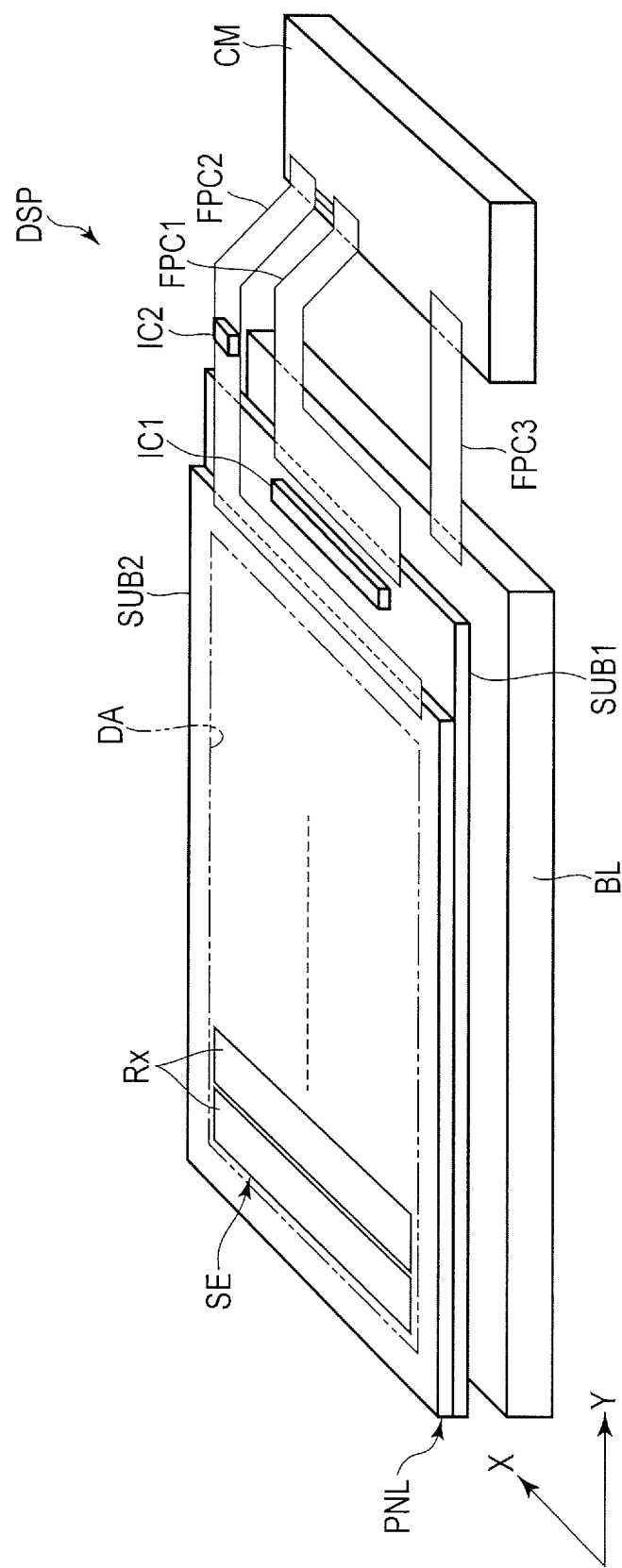
FIG. 1 is a perspective view which schematically shows the structure of a sensor-equipped display device of a first embodiment.

FIG. 1 is a perspective view which schematically shows the structure of a sensor-equipped display device of a first embodiment. In this embodiment, a sensor-equipped display device is a liquid crystal display device. However, no limitation is intended thereby, and the display device may be self-luminous display devices such as an organic electroluminescent display device and the like, electronic paper display devices including electrophoresis elements and the like, and other flatpanel display devices. Furthermore, the sensor-equipped display device of the present embodiment may be adopted in various devices such as smartphones, tablet terminals, mobilephones, notebook computers, and gaming devices.

The liquid crystal display device DSP includes an active matrix type liquid crystal display panel PNL, driving IC chip IC1 which drives the liquid crystal display panel PNL, capacitive sensor SE, driving IC chip IC2 which drives the sensor SE, backlight unit BL which illuminates the liquid crystal panel PNL, control module CM, and flexible printed circuits FPC1, FPC2, and FPC3.

The liquid crystal display panel PNL includes a first substrate SUB1, second substrate SUB2 opposed to the first substrate SUB1, and liquid crystal layer (liquid crystal layer LQ which is described later) held between the first substrate SUB1 and the second substrate SUB2. In the present embodiment, the first substrate SUB1 may be reworded into an array substrate and the second substrate SUB2 may be reworded into a countersubstrate. The liquid crystal display panel PNL includes a display area (active area) DA which displays images. The liquid crystal display panel PNL is a transmissive type display panel having a transmissive display function which displays images by selectively transmitting the light from the backlight unit BL. The liquid crystal display panel PNL may be a transflective type display panel having a reflective display function which displays images by selectively reflecting external light in addition to the transmissive display function.

The backlight unit BL is disposed at the rear surface side of the first substrate SUB1. As a light source of the backlight unit BL, various models can be used including luminescent diode (light emitting diode, LED) and the like. If the liquid crystal display panel PNL is of reflective type having the reflective display function alone, the liquid crystal display device DSP does not necessarily include the backlight unit BL.

The sensor SE includes a plurality of detection electrodes Rx. The detection electrodes Rx are provided with a detection surface (X-Y flat surface) which is, for example, above and parallel to the display surface of the liquid crystal display panel PNL. In the example depicted, the detection electrodes Rx are extended substantially in direction X and are arranged side-by-side in direction Y. Otherwise, the detection electrodes Rx may be extended in direction Y and arranged side-by-side in direction X, or the detection electrodes Rx may be formed in an island shape and be arranged in a matrix in directions X and Y. In this embodiment, directions X and Y are orthogonal to each other.

The driving IC chip IC1 is mounted on the first substrate SUB1 of the liquid crystal display panel PNL. The flexible printed circuit FPC1 connects the liquid crystal display panel PNL with the control module CM. The flexible printed circuit FPC2 connects the detection electrodes Rx of the sensor SE with the control module CM. The driving IC chip IC2 is mounted on the flexible printed circuit FPC2. The flexible printed circuit FPC3 connects the backlight unit BL with the control module CM.

Figure 2:
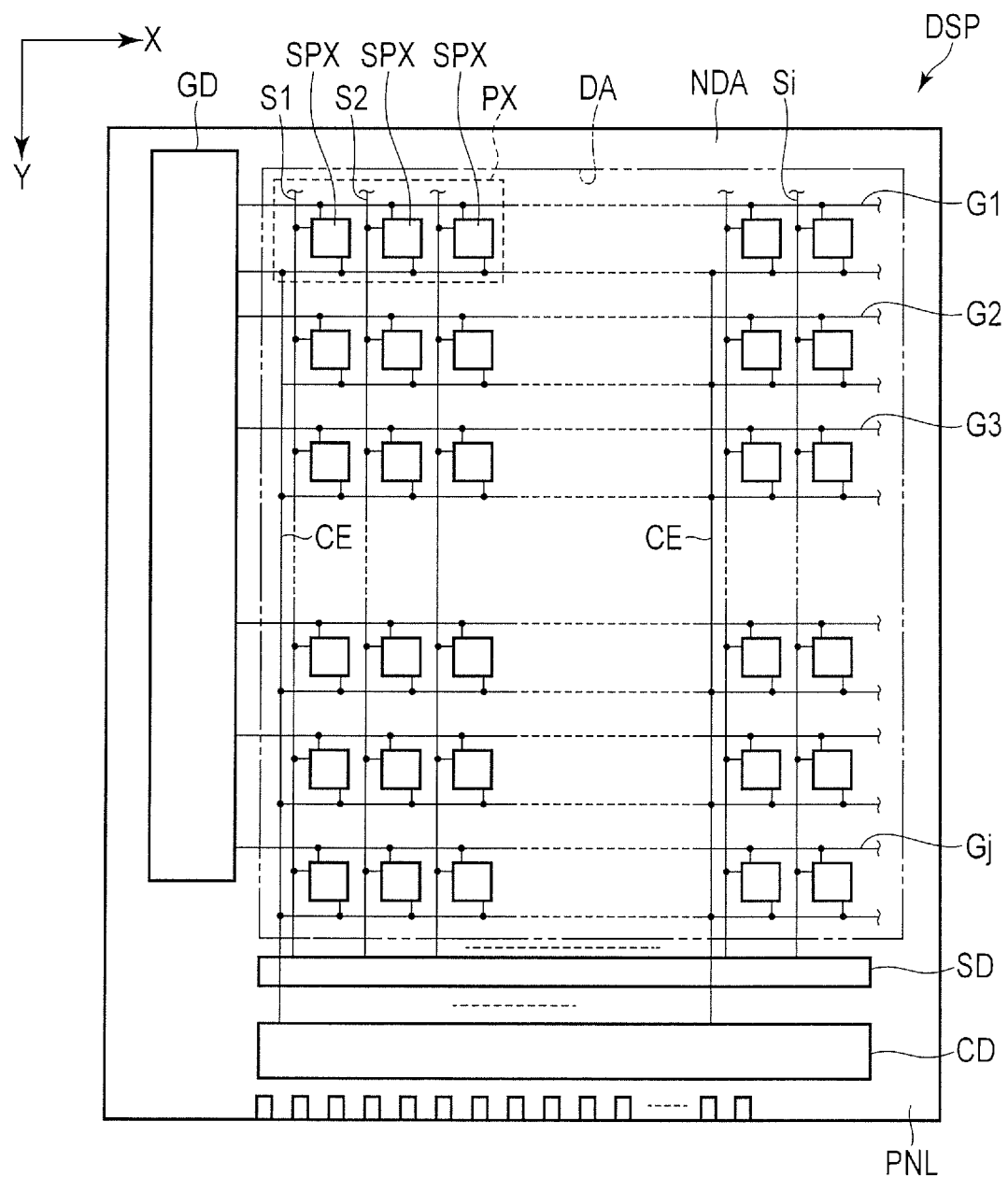
FIG. 2 is a view which schematically shows the basic structure and equivalent circuit of the display device.

FIG. 2 is a view which schematically shows the basic structure and equivalent circuit of the liquid crystal display device DSP shown in FIG. 1. In addition to the liquid crystal display panel PNL, the liquid crystal display device DSP includes a source line driving circuit SD, gate line driving circuit GD, common electrode driving circuit CD within a non-display area NDA which is outside the display area DA.

The liquid crystal display panel PNL includes a plurality of subpixels SPX within the display area DA. The subpixels SPX are arranged in a matrix of i×j (i and j are positive integers) in directions X and Y. Subpixels SPX are provided to correspond to colors such as red, green, blue, and white. A unit pixel PX is composed of subpixels SPX those correspond to different colors, and is a minimum unit which constitutes a displayed color image. Furthermore, the liquid crystal display panel PNL includes j gate lines G (G1 to Gj), i source lines S (S1 to Si), and common electrode CE within the display area DA.

The gate lines G are extended substantially linearly in direction X to be drawn outside the display area DA and connected to the gate line driving circuit GD. Furthermore, the gate lines G are arranged in direction Y at intervals. The source lines S are extended substantially linearly in direction Y to be drawn outside the display area DA to cross the gate lines G. Furthermore, the source lines S are arranged in direction X at intervals. The gate lines G and the source lines S are not necessarily extended linearly and may be extended partly being bent. The common electrode CE is drawn outside the display area DA to be connected with the common electrode driving circuit CD. The common electrode CE is shared with a plurality of subpixels SPX. The common electrode CE is described later in detail.

FIG. 3 is a view which shows an equivalent circuit of the subpixel SPX shown in FIG. 2. Each subpixel SPX includes a switching element PSW, pixel electrode PE, common electrode CE, and liquid crystal layer LQ. The switching element PSW is formed of, for example, a thin film transistor. The switching element PSW is electrically connected to the gate line G and the source line S. The switching element PSW is of either top gate type or bottom gate type. The semiconductor layer of the switching element PSW is formed of, for example, polysilicon; however, it may be formed of amorphous silicon, oxide semiconductor, or the like. The pixel electrode PE is electrically connected with the switching element PSW. The pixel electrode PE is opposed to the common electrode CE. The common electrode CE and the pixel electrode PE form a retaining capacitance CS.

FIG. 4 is a cross-sectional view which schematically and partly shows the structure of the liquid crystal display device DSP. The liquid crystal display device DSP includes a first optical element OD1 and second optical element OD2 in addition to the above-described liquid crystal display panel PNL and backlight unit BL. The liquid crystal display panel PNL depicted in the Figure has a structure corresponding to a fringe field switching (FFS) mode as its display mode; however, no limitation is intended thereby, and the liquid crystal display panel PNL may have a structure which corresponds to another display mode.

The liquid crystal display panel PNL includes the first substrate SUB1, second substrate SUB2, and liquid crystal layer LQ. The first substrate SUB1 and the second substrate SUB2 are attached to each other with a certain cell gap formed therebetween. The liquid crystal layer LQ is held in the cell gap between the first substrate SUB1 and the second substrate SUB2.

The first substrate SUB1 is formed based on a transmissive first insulating substrate 10 such as a glass substrate or a resin substrate. The first substrate SUB1 includes the source lines S, common electrodes CE, pixel electrode PE, first insulating film 11, second insulating film 12, third insulating film 13, and first alignment film AL1 on the surface of the first insulating substrate 10 at the side opposed to the second substrate SUB2.

The first insulating film 11 is disposed on the first insulating substrate 10. Although this is not described in detail, the gate lines G, gate electrode of the switching element, and semiconductor layer are provided between the first insulating substrate 10 and the first insulating film 11. The source lines S are formed on the first insulating film 11. Furthermore, source electrode and drain electrode of the switching element PSW are formed on the first insulating film 11.

The second insulating film 12 is disposed on the source lines S and the first insulating film 11. The common electrode CE is formed on the second insulating film 12. This common electrode CE is formed of a transparent conductive material such as indium tin oxide (ITO) and indium zinc oxide (IZO). In the example depicted, a metal layer ML is formed on the common electrode CE to lower the resistance of the common electrode CE; however, this metal layer ML may be omitted.

The third insulating film 13 is disposed on the common electrodes CE and the second insulating film 12. The pixel electrodes PE are formed on the third insulating film 13. Each pixel electrode PE is disposed between adjacent source lines S to be opposed to the common electrode CE. Furthermore, each pixel electrode has a slit SL at a position to be opposed to the common electrode CE. This pixel electrode PE is formed of a transparent conductive material such as ITO or IZO. The first alignment film AL1 covers the pixels electrodes and the third insulating film 13.

On the other hand, the second substrate SUB2 is formed based on a transmissive second insulating substrate 20 such as a glass substrate or a resin substrate. The second substrate SUB2 includes black matrixes BM, color filters CFR, CFG, and CFB, overcoat layer OC, and second alignment film AL2 on the surface of the second insulating substrate 20 at the side opposed to the first substrate SUB1.

The black matrixes BM are formed on the inner surface of the second insulating substrate 20 to define the subpixels SPX one another.

Each of color filters CFR, CFG, and CFB is formed on the inner surface of the second insulating substrate 20 and partly overlaps the black matrix BM. Color filter CFR is a red filter which is disposed to correspond to a red subpixel SPXR and is formed of a red resin material. Color filter CFG is a green filter which is disposed to correspond to a green subpixel SPXG and is formed of a green resin material. Color filter CFB is a blue filter which is disposed to correspond to a blue subpixel SPXB and is formed of a blue resin material. In the example depicted, a unit pixel PX is composed of subpixels SPXR, SPXG, and SPXB those correspond to red, green, and blue, respectively. However, the unit pixel PX is not limited to a combination of the above-mentioned three subpixels SPXR, SPXG, and SPXB. For example, the unit pixel PX may be composed of four subpixels SPX including a white subpixel SPXW in addition to the subpixel SPXR, SPXG, and SPXB. In that case, a white or transparent filter may be disposed to correspond to the subpixel SPXW, or a color filter corresponding to the subpixel SPXW may be omitted. Or, a subpixel of a different color such as yellow may be disposed instead of a white subpixel.

The overcoat layer OC covers color filters CFR, CFG, and CFB. The overcoat layer OC is formed of a transparent resin material. The second alignment film AL2 covers the overcoat layer OC.

The detection electrode Rx is formed on the outer surface of the second insulating substrate 20. That is, in the present embodiment, the detection surface is disposed on the outer surface of the second insulating substrate 20. The detailed structure of the detection electrode Rx is described later.

As can be clearly understood from FIGS. 1 to 4, both the detection electrode Rx and the common electrode CE are disposed in different layers in the normal direction of the display area DA, and they are opposed to each other with dielectrics intervening therebetween such as third insulating film 13, first alignment film AL1, liquid crystal layer LQ, second alignment film AL2, overcoat layer OC, color filters CFR, CFG, and CFB, and second insulating substrate 20.

The first optical element OD1 is interposed between the first insulating substrate 10 and the backlight unit BL. The second optical element OD2 is disposed above the detection electrode Rx. Each of the first optical element OD1 and the second optical element OD2 includes at least a polarizer and may include a retardation film if necessary.

Now, the capacitive sensor SE mounted on the liquid crystal display device DSP of the present embodiment is explained. FIG. 5 is a plan view which schematically shows a structural example of the sensor SE. In the example depicted, the sensor SE is composed of the common electrode CE of the first substrate SUB1 and the detection electrodes Rx of the second substrate SUB2. That is, the common electrode CE functions as an electrode for display and also as an electrode for sensor driving.

The liquid crystal display panel PNL includes lead lines L in addition to the common electrode CE and the detection electrodes Rx. The common electrode CE and the detection electrodes Rx are disposed within the display area AA. In the example depicted, the common electrode CE includes a plurality of divisional electrodes C. Divisional electrodes C are extended substantially linearly in direction Y and arranged at intervals in direction X within the display area DA. The detection electrodes Rx are extended substantially linearly in direction X and arranged at intervals in direction Y within the display area DA. That is, the detection electrodes Rx are extended to cross the divisional electrodes C. As mentioned above, the common electrode CE and the detection electrodes Rx are opposed to each other with various dielectrics intervening therebetween.

Now, a display driving operation performed to display images in the liquid crystal display device DSP in the above-described FFS mode is described. First, the off-state where no voltage is applied to the liquid crystal layer LQ is explained. The off-state is a state where a potential difference is not formed between the pixel electrode PE and the common electrode CE. In this off-state, liquid crystal molecules in the liquid crystal layer LQ are aligned in the same orientation within X-Y plane as their initial alignment by the alignment restriction force between the first alignment film AL1 and the second alignment film AL2. The light from the backlight unit BL partly transmits the polarizer of the first optical element OD1 and is incident on the liquid crystal display panel PNL. The light incident on the liquid crystal display panel PNL is linear polarization which is orthogonal to an absorption axis of the polarizer. The state of the linear polarization does not substantially change when passing though the liquid crystal display panel PNL in the off-state. Thus, the majority of the linear polarization which have passed through the liquid crystal display panel PNL are absorbed by the polarizer of the second optical element OD2 (black display).

Next, the on-state where a voltage is applied to the liquid crystal layer LQ is explained. The on-state is a state where a potential difference is formed between the pixel electrode PE and the common electrode CE. That is, common driving signals are supplied to the common electrode CE to set it to the common potential. Furthermore, image signals to form the potential difference with respect to the common potential are supplied to the pixel electrode PE. Consequently, a fringe field is generated between the pixel electrode PE and the common electrode CE in the on-state. In this on-state, the liquid crystal molecules are aligned in the orientation different from that of the initial alignment within X-Y plane. In the on-state, the linear polarization which is orthogonal to the absorption axis of the polarizer of the first optical element OD1 is incident on the liquid crystal display panel PNL and its polarization state changes depending on the alignment of the liquid crystal molecules when passing through the liquid crystal layer LQ. Thus, in the on-state, at least part of the light which has passed through the liquid crystal layer LQ transmits the polarizer of the second optical element OD2 (white display). With this structure, a normally black mode is achieved.

The number, size, and shape of the divisional electrodes C are not limited specifically and can be changed arbitrarily. Furthermore, the divisional electrodes C may be arranged at intervals in direction Y and extended substantially linearly in direction X. Moreover, the common electrode CE is not necessarily divided and may be a single plate electrode formed continuously within the display area DA.

Within the detection surface on which the detection electrodes Rx are disposed, dummy electrodes DR are provided between adjacent detection electrodes Rx. The dummy electrodes DR are extended substantially linearly in direction X similarly to the detection electrodes Rx. These dummy electrodes DR are not connected with the lines such as lead lines L, and are in the electrically floating state. The dummy electrodes DR do not play any role in detection of a contact or approach of an object. That is, the dummy electrodes DR are not necessary from the object detection standpoint. However, without such dummy electrodes DR, the screen display of the liquid crystal display panel PNL will be optically nonuniform. Therefore, the dummy electrodes DR should preferably be provided.

The lead lines L are disposed within the non-display area NDA and are electrically connected to the detection electrodes Rx one to one. Each of the lead lines L outputs a sensor output value from its corresponding detection electrode Rx. The lead lines L are disposed in the second substrate SUB2 similarly to the detection electrodes Rx, for example.

The liquid crystal display device DSP further includes the common electrode driving circuit CD disposed within the non-display area NDA. Each of the divisional electrodes C is electrically connected to the common electrode driving circuit CD. The common electrode driving circuit CD selectively supplies common driving signals (first driving signals) to drive the subpixels SPX and sensor driving signals (second driving signals) to drive the sensor SE to the divisional electrodes C. For example, the common electrode driving circuit CD supplies the common driving signals in a display driving time to display images on the display area DA and supplies sensor driving signals in a sensor driving time to detect a contact or approach of an object to the detection surface.

The flexible printed circuit FPC2 is electrically connected to each of the lead lines L. A detection circuit RC is accommodated in, for example, the driving IC chip IC2. The detection circuit RC detects a contact or approach of an object to the liquid crystal display device DSP base on the sensor output value from the detection electrodes Rx. Furthermore, the detection circuit RC can detect positional data of the position to which the object contacts or approaches. The detection circuit RC may be accommodated in the control module CM instead.

Figure 6:
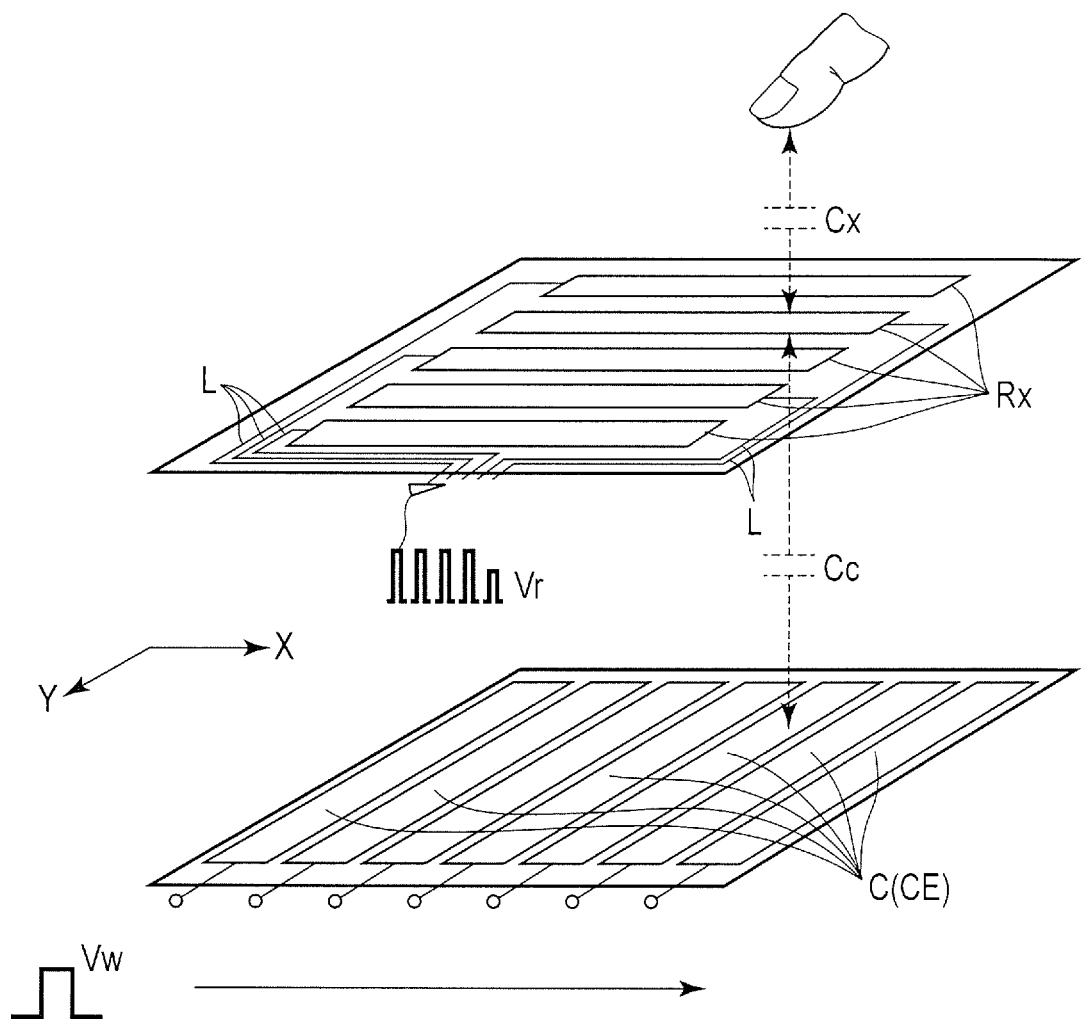
FIG. 6 is a view which illustrates a principle of sensing (mutual-capacitive sensing method) performed by the sensor of the display device.

Now, the specific operation performed in detecting a contact or approach of an object by the liquid crystal display device DSP is explained with reference to FIG. 6. A capacitance Cc exists between the divisional electrodes C and the detection electrodes Rx. The common electrode driving circuit CD supplies pulse-shaped sensor driving signals Vw to each of the divisional electrodes C at certain periods. In the example depicted, a finger of a user is given to be close to a crossing point of a particular detection electrode Rx and a particular divisional electrode C. The finger close to the detection electrode Rx generates a capacitance Cx. When the pulse-shaped sensor driving signals Vw are supplied to the divisional electrodes C, the particular detection electrode Rx shows a pulse-shaped sensor output value Vr of which level is less than those are obtained from the other detection electrodes. This sensor output value Vr is supplied to the detection circuit RC through the lead lines L.

The detection circuit RC detects two-dimensional positional data of the finger within the X-Y plane (detection surface) based on the timing when the sensor driving signals Vw are supplied to the divisional electrodes C and the sensor output value Vr from each detection electrode Rx. Furthermore, capacitance Cx varies between the states where the finger is close to the detection electrode Rx and where the finger is distant from the detection electrode Rx. Thus, the level of the sensor output value Vr varies between the states where the finger is close to the detection electrode Rx and where the finger is distant from the detection electrode Rx. Using this mechanism, the detection circuit RC may detect the proximity of the finger with respect to the sensor SE (distance between the finger and the sensor SE in the normal direction) based on the level of the sensor output value Vr.

The above-explained detection method of the sensor SE is referred to as a mutual-capacitive method or a mutual-capacitive sensing method. The detection method applied to the sensor SE is not limited to such a mutual-capacitive sensing method and may be other methods. For example, the following methods may be applied to the sensor SE: a self-capacitive method, a self-capacitive sensing method, and the like.

Figure 7:
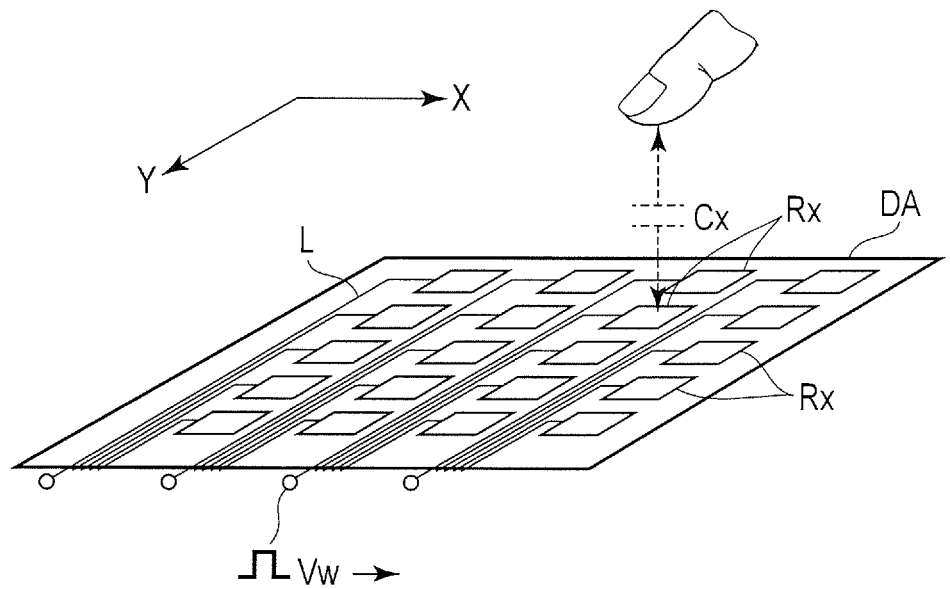
FIG. 7 is a view which illustrates another principle of sensing (self-capacitive sensing method) performed by the sensor of the display device.
Figure 8:
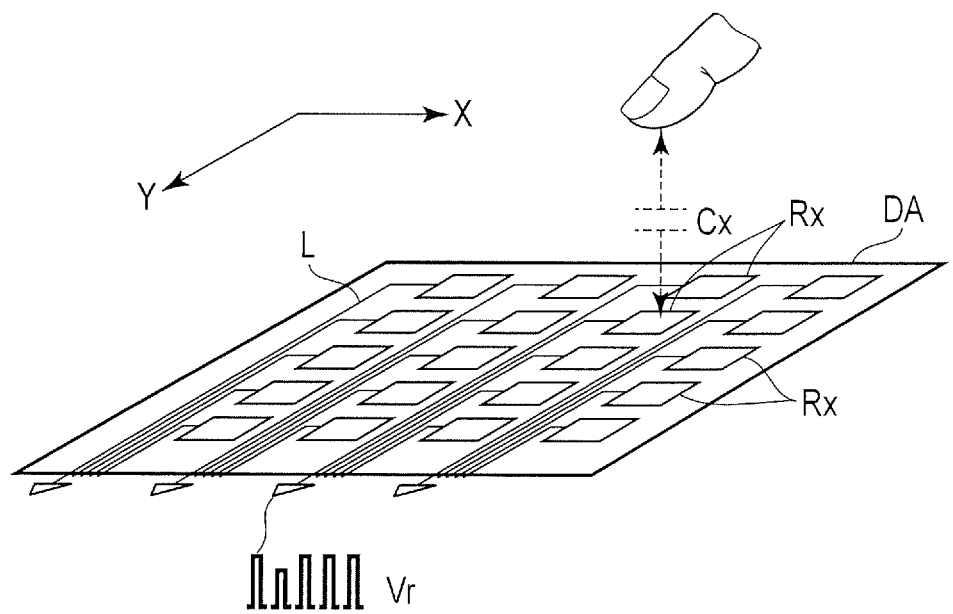
FIG. 8 is a view which illustrates said another principle of sensing (self-capacitive sensing method) performed by the sensor of the display device.

FIGS. 7 and 8 show the specific operation performed in detecting a contact or approach of an object by the liquid crystal display device DSP using the self-capacitive sensing method. In FIGS. 7 and 8, the detection electrodes Rx are formed as islands and arranged in a matrix along directions X and Y on the display area DA. The lead lines L are electrically connected to the detection electrodes Rx one to one at their ends. The other ends of the lead lines L are, as in the example shown in FIG. 5, connected to the flexible printed circuit FPC2 including the driving IC chip IC2 in which the detection circuit RC is accommodated. In the example depicted, a finger of a user is given to be close to a particular detection electrode Rx. The finger close to the detection electrode Rx generates a capacitance Cx.

As shown in FIG. 7, the detection circuit RC supplies pulse-shaped sensor driving signals Vw (driving voltage) to each of the detection electrodes Rx at certain periods. By the sensor driving signals Vw, each detection electrode Rx itself is charged.

After the sensor driving signal Vw supply, the detection circuit RC reads the sensor output value Vr from each of the detection electrodes Rx as shown in FIG. 8. The sensor output value Vr corresponds to, for example, the charge on each detection electrode Rx itself. In the detection electrodes Rx arranged on the X-Y plane (detection surface), the sensor output value Vr read from the detection electrode Rx at which a capacitance Cx is generated between itself and the finger is different from the sensor output values Vr read from the other detection electrodes Rx. Therefore, the detection circuit RC can detect the two-dimensional positional data of the finger on the X-Y plane based on the sensor output values Vr of the detection electrodes Rx.

Figure 9:
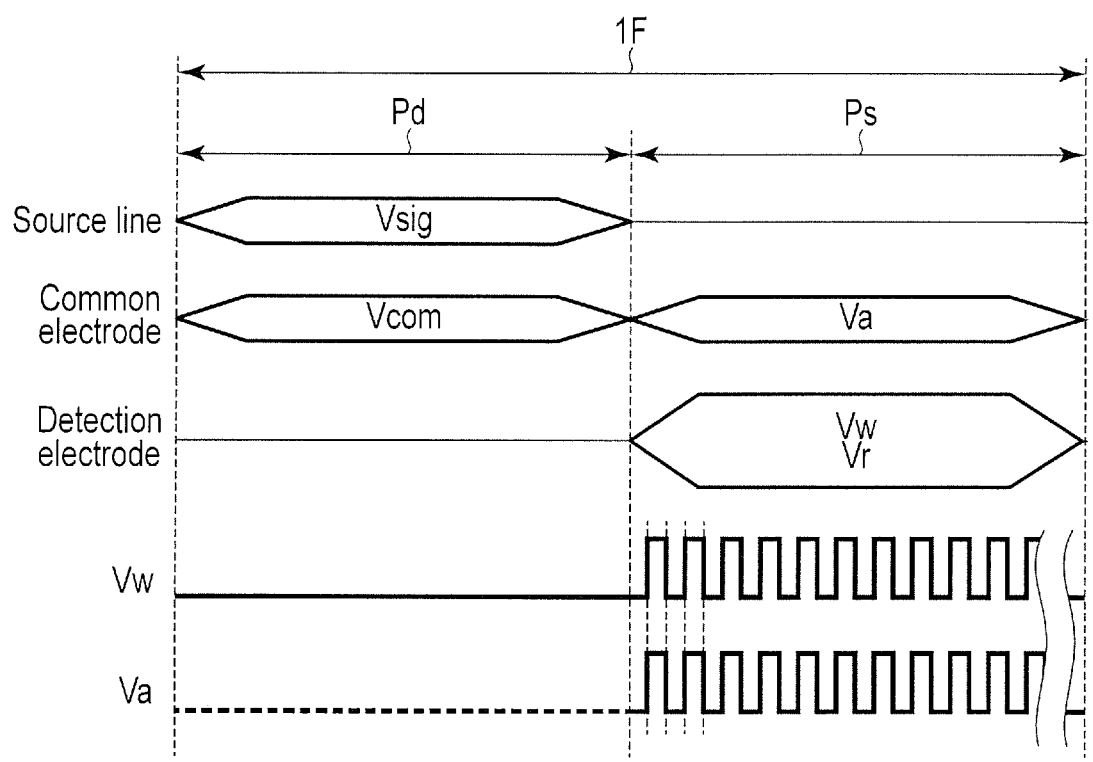
FIG. 9 is a view which illustrates a specific example of how to drive the sensor in the self-capacitive sensing method.

Now, a specific example of how to drive the sensor SE in the self-capacitive sensing method is explained with reference to FIG. 9. In the example depicted, a display operation performed in a display operation period Pd and a detection operation of input positional data performed in a detection operation period Ps within one frame (1F) period. The detection operation period Ps is a period excluded from the display operation period Pd and is, for example, a blanking period in which the display operation halts.

In the display operation period Pd, the gate line driving circuit GD supplies control signals to the gate lines G, the source line driving circuit SD supplies image signals Vsig to the source lines S, and the common electrode driving circuit CD supplies common driving signals Vcom (common voltage) to the common electrode CE (divisional electrodes C) for the drive of the liquid crystal display panel PNL.

In the detection operation period Ps, the input of control signal, image signal Vsig, and common driving signal Vcom to the liquid crystal display panel PNL are stopped and the sensor SE is driven. When driving the sensor SE, the detection circuit RC supplies sensor driving signals Vw to the detection electrodes Rx, reads the sensor output values Vr indicative of changes in capacitance in the detection electrodes Rx, and operates the input positional data based on the sensor output values Vr. In this detection operation period Rs, the common electrode driving circuit CD supplies potential adjustment signals Va, of which waveform is the same as that of the sensor driving signals Vw supplied to the detection electrodes Rx, to the common electrode CE in synchronization with sensor driving signals Vw. Here, the same waveform means that the sensor driving signals Vw and the potential adjustment signals are the same with respect to their phase, amplitude, and period. By supplying such potential adjustment signals Va to the common electrode CE, a stray capacitance (parasitic capacitance) between the detection electrodes Rx and the common electrode CE can be removed and the operation of the input positional data can be performed accurately.

FIG. 10 is a view which schematically shows an example of the detection electrodes Rx arranged in a matrix. In the example depicted, detection electrodes Rx1, Rx2, and Rx3 are aligned in direction Y. Detection electrodes Rx1 are connected to pads PD1 through lead lines L1. Detection electrodes Rx2 are connected to pads PD2 through lead lines L2. Detection electrodes Rx3 are directly connected to pads PD3. Pads PD1 to PD3 are connected to flexible printed circuit FPC2. Detection electrodes Rx1 to Rx3 are, for example, formed in a mesh structure of metal material line fragments (line fragments T described later) connected to each other. However, the structure of detection electrodes Rx1 to Rx3 is not limited to that shown in FIG. 10 and may be replaced with one of various structures including the structures described in the following example. For example, the line fragment may also be called as a conductive fragment, a metal fragment, a thin fragment, a unit fragment, a conductive line, a metal line, a thin line, or a unit line.

In direction X, detection electrodes Rx1 to Rx3, lead lines L1 and L2, and pads PD1 to PD3 are aligned at certain intervals. Between a set of detection electrodes Rx1 to Rx3 and its adjacent sets of detection electrodes Rx1 to Rx3 in direction X, dummy electrodes DR are disposed. The dummy electrodes DR are formed in a mesh structure of line fragments as in detection electrodes Rx1 to Rx3. However, the line fragments of the dummy electrode DR are not connected to each other or connected to any of detection electrodes Rx1 to Rx3, lead lines L1 and L2, and pads PD1 to PD3. That is, the line fragments of the dummy electrode DR are in the electrically floating state. By arranging the detection electrodes Rx and the dummy electrodes DR which are alike in shape, the screen display of the liquid crystal display panel PNL can be maintained optically uniform.

Next, the detailed structure of the detection electrodes Rx is explained. Note that the structure of the detection electrodes Rx can be applied to various detection methods including the above-described mutual-capacitive sensing method, self-capacitive sensing method, and the like.

The detection electrodes Rx have an electrode pattern (electrode pattern PT) of metal material line fragments (line fragments T described later) combined together. The line fragment is formed of a metal material such as aluminum (Al), titan (Ti), silver (Ag), molybdenum (Mo), tungsten (W), cupper (Cu), and chrome (Cr), or of an alloy including such a material. The width of the line fragment should preferably be set to fall within such a range that does not decrease the transmissivity of each pixel while maintaining a certain resistance to a break. For example, the width may be set to fall within a range between 3 and 10 μm inclusive.

Figure 11:
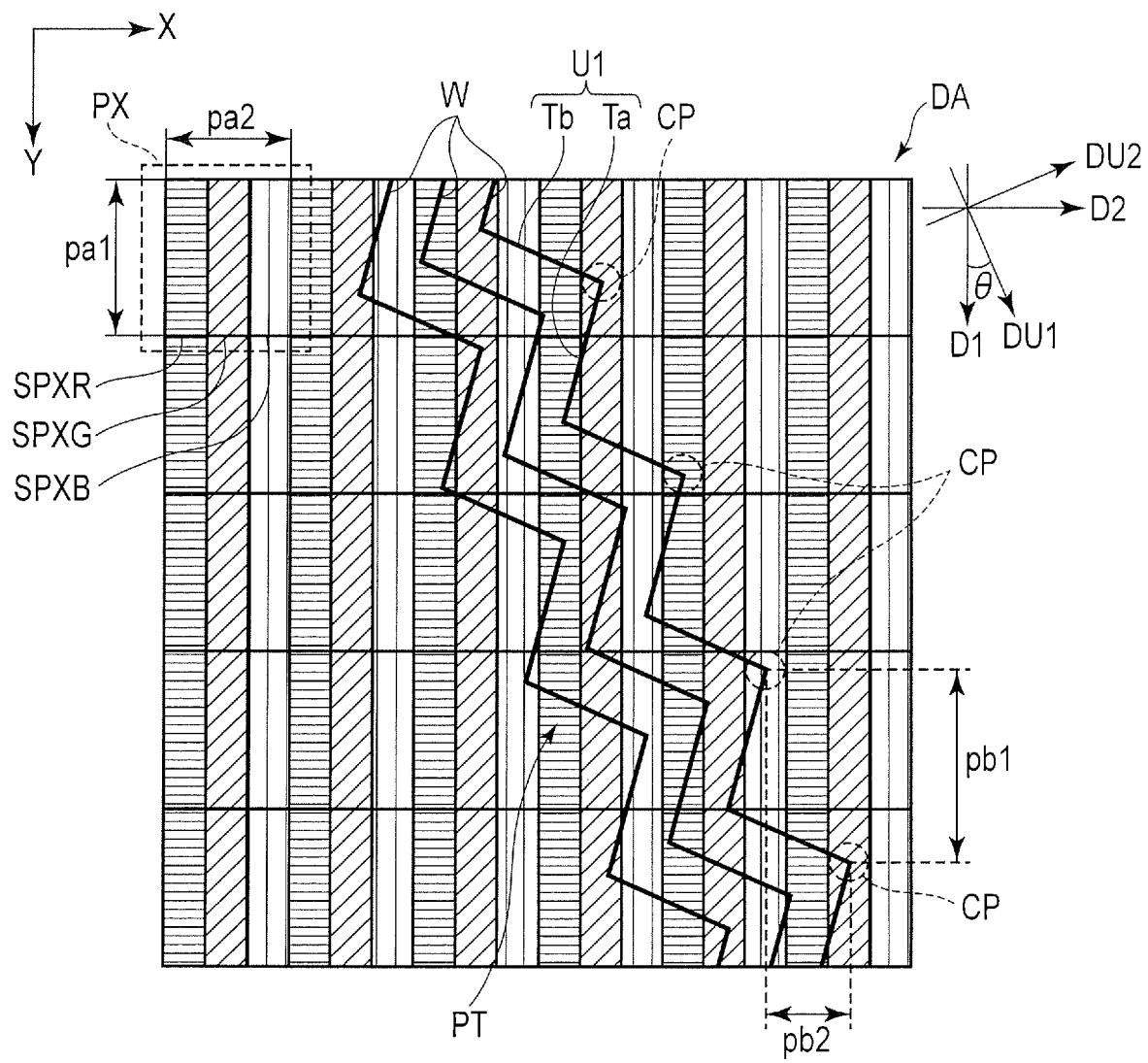
FIG. 11 is a view which schematically shows an arrangement example of unit pixels and electrode patterns in a display area.

Now, an example of a pixel arrangement and an electrode pattern of detection electrodes Rx within the display area DA are explained. FIGS. 11 and 12 schematically show unit pixels PX and electrode pattern PT of detection electrodes Rx within the display area DA in part.

In FIGS. 11 and 12, unit pixels PX are arranged in a matrix in both directions X and Y. In FIG. 11, each unit pixel PX is composed of red, green, and blue subpixels SPXR, SPXG, and SPXB. Red subpixels SPXR, green subpixels SPXG, and blue subpixels SPXB are aligned in direction Y, respectively. In FIG. 12, each unit pixel PX is composed of red, green, blue, and white subpixels SPXR, SPXG, SPXB, and SPXW. Red subpixels SPXR, green subpixels SPXG, blue subpixels SPXB, and white subpixels SPXW are aligned in direction Y, respectively.

Within the display area DA, an arrangement direction of subpixels SPX which possess maximum luminosity for humans (the human eye) is defined as first direction D1. Furthermore, a direction orthogonal to first direction D1 is defined as second direction D2. In the display area DA shown in FIG. 11, green subpixel SPXG possesses the maximum luminosity for humans. Therefore, in the example of FIG. 11, the direction in which green subpixels SPXG are aligned, that is, direction Y is defined as first direction D1, and direction X orthogonal to first direction D1 is defined as second direction D2. Furthermore, in the display area DA shown in FIG. 12, white subpixel SPXW possesses the maximum luminosity for humans. Therefore, in the example of FIG. 12, the direction in which white subpixels SPXW are aligned, that is, direction Y is defined as first direction D1, and direction X orthogonal to first direction D1 is defined as second direction D2.

In the description below, the unit pixel PX in the display area DA has a pitch in first direction D1 which is referred to as first pixel pitch pa1 and a pitch in second direction D2 which is referred to as second pixel pitch pa2. Specifically, first pixel pitch pa1 and second pixel pitch pa2 of a unit pixel PX are, as depicted in FIGS. 11 and 12, a length of a unit pixel PX in first direction D1 (direction Y) and a length of a unit pixel PX in second direction D2 (direction X), respectively.

The electrode pattern PT includes a plurality of detection lines W extending zigzag. A detection line W is composed of unit patterns U1 arranged in a first arrangement direction DU1 alternately, and each unit pattern U1 is a combination of two kinds of line fragments Ta and Tb jointed at their ends while extending in different directions. First arrangement direction DU1 is tilted counterclockwise at angle θ with respect to first direction D1. In the examples of FIGS. 11 and 12, the electrode pattern PT is composed of three detection lines W arranged at regular intervals in second arrangement direction DU2 which is orthogonal to first arrangement direction DU1.

In the examples of FIGS. 11 and 12, line fragments Ta and Tb those are in a unit pattern U1 or those are adjacent at a boundary between two unit patterns U1 form an obtuse angle. Note that line fragments Ta and Tb may be jointed to form an acute angle or a right angle instead. The electrode pattern PT may be composed of more detection lines W or may be composed of two detection lines W or less. The dummy electrodes DR are disposed in the proximity of electrode patterns PT practically; however, they are omitted from the depiction in FIGS. 11 and 12.

The electrode pattern PT includes a number of connection points of line fragments Ta and Tb. The connection points are aligned linearly in part. Dotted line circles shown in FIGS. 11 and 12 indicate a connection point group aligned linearly. Connection points CP in a connection point group are extracted from the connection points in a single detection line W alternately and aligned at regular intervals in first arrangement direction DU1.

In the description below, the connection point group aligned linearly has a pitch in first direction D1 which is referred to as first connection point pitch pb1 and a pitch in second direction D2 which is referred to as second connection point pitch pb2. Specifically, first connection point pitch pb1 and second connection point pitch pb2 are, as depicted in FIGS. 11 and 12, a gap between two connection points CP adjacent in first direction D1 (direction Y) and a gap between two connection points CP adjacent in second direction D2 (direction X), respectively.

At the connection point of line fragments Ta and Tb formed of a metal material, the area of line fragments per unit area increases and the transmissivity of the light from the display area DA decreases. Consequently, a line in which the light transmissivity is lowered locally occurs along the arrangement direction of the connection points of line fragments Ta and Tb, and this line generates moiré by crossing the subpixels SPX of various colors.

To prevent or suppress such moiré due to the interference between the connection points and the display area DA, the shape of the electrode pattern PT is defined such that the connection point group aligned linearly satisfies both the following conditions 1 and 2.

$pb1 < 0.5 \times pa1 \times (L-0.05)$, or $0.5 \times pa1 \times (L+0.05) < pb1$ [Condition 1]

$pb2 < 0.5 \times pa2 \times (L-0.05)$, or $0.5 \times pa2 \times (L+0.05) < pb2$ [Condition 2]

Or, preferably, the following conditions 3 and 4 should be satisfied.

$pb1 < 0.5 \times pa1 \times (L-0.1)$, or $0.5 \times pa1 \times (L+0.1) < pb1$ [Condition 3]

$pb2 < 0.5 \times pa2 \times (L-0.1)$, or $0.5 \times pa2 \times (L+0.1) < pb2$ [Condition 4]

In conditions 1 to 4, L is a positive integer. Conditions 1 to 4 must be satisfied as to any integer L, not a particular integer L.

The electrode pattern PT has a connection point group aligned linearly in addition to the connection point group of the connection points CP shown in FIGS. 11 and 12. For example, in a single detection line W, the connection points between the connection points CP are aligned linearly in first arrangement direction DU1. Furthermore, connections points of different detection lines W may be aligned linearly. Ideally, conditions 1 and 2 or 3 and 4 should be satisfied in the entire connection point groups aligned linearly to prevent or suppress moiré more effectively. However, if conditions 1 and 2 or 3 and 4 are satisfied in at least one of the connection point groups aligned linearly, the advantage to prevent or suppress moiré due to the interference between the connection point group and the display area DA can still be achieved. For example, amongst the connection point groups in an electrode pattern PT, a connection point group having a minimal gap between connection points adjacent therein or a connection point group having a maximal gap between connections points at both ends therein may satisfy conditions 1 and 2 or 3 and 4.

Now, the technical significance of conditions 1 to 4 is explained.

FIGS. 13 and 14 indicate results of evaluations conducted to evaluate moiré due to the interference between connection points in an electrode pattern PT and the display area DA shown in FIG. 11 (type A), and between connection points in an electrode pattern PT and the display area DA shown in FIG. 12 (type B) where the first connection point pitch pb1 and the second connection point pitch pb2 are changed variously.

FIG. 13 shows first connection point pitch pb1 [μm], second connection point pitch pb2 [μm], moiré evaluation result (moiré level) in each of type A and type B, a value obtained by dividing first connection point pitch pb1 by 0.5 times first pixel pitch pa1 (pb1/0.5×pa1), and a value obtained by dividing second connection point pitch pb2 by 0.5 times second pixel pitch pa2 (pb2/0.5×pa2) as to evaluation examples E101 to E124. In evaluation examples E101 to E124, a tilt angle θ of first arrangement direction DU1 with respect to first direction D1 was set to 33.69°.

FIG. 14 shows first connection point pitch pb1 [μm], second connection point pitch pb2 [μm], moiré evaluation result (moiré level) in each of type A and type B, a value obtained by dividing first connection point pitch pb1 by 0.5 times first pixel pitch pa1 (pb1/0.5×pa1), and a value obtained by dividing second connection point pitch pb2 by 0.5 times second pixel pitch pa2 (pb2/0.5×pa2) as to evaluation examples E201 to E226. In evaluation examples E201 to E226, a tilt angle θ of first arrangement direction DU1 with respect to first direction D1 was set to 38.00°.

In the evaluations, the moiré was rated on a scale of 1 to 4 where scale 1 corresponds to the best display quality (least influenced by moiré) and scale 4 corresponds to the poorest display quality (most influenced by moiré). Scales 1 to 4 are hereinafter referred to as levels 1 to 4. Both first pixel pitch pa1 and second pixel pitch pa2 in the display area DA of type A are 58.8 μm. First pixel pitch pa1 and second pixel pitch pa2 in the display area DA of type B are 103.5 and 138 μm, respectively.

In the evaluations of type A, evaluation examples E112 and E124 indicated level 4; E116, E204, E213, E216, E218, E223, and E224 indicated level 3; E101, E104, E105, E107, E108, E118, E120, E205, E209, and E210 indicated level 2; and the other examples indicated level 1.

In the evaluations of type B, evaluation examples E108, E118, E123, E124, E202, E203, E212, and E213 indicated level 3; E101, E107, E109, E113, E114, E119, E201, E211, and E214 indicated level 2, and the other examples indicated level 1. In FIGS. 13 and 14, the evaluation results and the like of level 3 and level 4 are hatched and the evaluation results and the like of level 2 are dotted.

Referring to the evaluation examples which indicated level 3 or 4, at least either pb1/(0.5×pa1) or pb2/(0.5×pa2) in most cases is between integer L−0.05 and integer L+0.05, inclusive, and this is irrelevant to angle θ. This means that moiré tends to occur easily when either pb1/(0.5×pa1) or pb2/(0.5×pa2) is substantially equal to integer L. As a result, conditions 1 and 2 mentioned above can be derived.

Furthermore, referring to the evaluation examples which indicated level 2, at least either pa1/(0.5×pa1) or pb2/(0.5×pa2) in most cases is between integer L−0.1 and integer L+0.1, inclusive, and this is irrelevant to angle θ. As a result, conditions 3 and 4 mentioned above can be derived as better conditions to prevent or reduce moiré.

With the sensor SE including the detection electrodes Rx composed of the electrode pattern PT which satisfies above conditions 1 and 2 or 3 and 4, a liquid crystal display device DSP which can prevent or suppress moiré can be achieved.

Furthermore, in this embodiment, the detection electrodes Rx and the sensor driving electrode (common electrode) those are components of the sensor SE are disposed on different layers with dielectrics interposed therebetween. If the detection electrodes Rx and the sensor driving electrode were provided with the same layer, an electric corrosion would occur between the detection electrodes Rx and the sensor driving electrode. The structure of the present embodiment can prevent such an electric corrosion.

Furthermore, in the present embodiment, the common electrode disposed inside the liquid crystal display panel PNL is used for both the electrode for display and the electrode for sensor driving in the above-described mutual-capacitive method or mutual-capacitive sensing method, and thus, there is no need of a sensor driving electrode for sensing purpose only disposed in the liquid crystal display device DSP. If such a sensor driving electrode for sensing purpose only is provided therein, moiré may occur due to the interference between the sensor driving electrode and the detection electrodes Rx or the display area DA. The present embodiment can prevent such moiré. Furthermore, in the present embodiment, the common electrode CE is formed of a transparent conductive material, and thus, moiré due to the interference between the common electrode CE and the display area DA or the detection electrodes Rx can be prevented or suppressed.

In addition to the above, various favorable advantages can be achieved by the present embodiment.

The shape of the electrode pattern PT is not limited to the model depicted in FIGS. 11 and 12. The shape of the electrode pattern PT can be changed as long as at least a part of the connection points included therein satisfies conditions 1 and 2 or 3 and 4, and the advantage to prevent or suppress moiré due to the interference between the electrode pattern PT and the display area DA can still be achieved.

Hereinafter, other embodiments of the electrode pattern PT are exemplified. Unless otherwise specified, the structure of the first embodiment is adopted therein.

(Second Embodiment)

Figure 15:
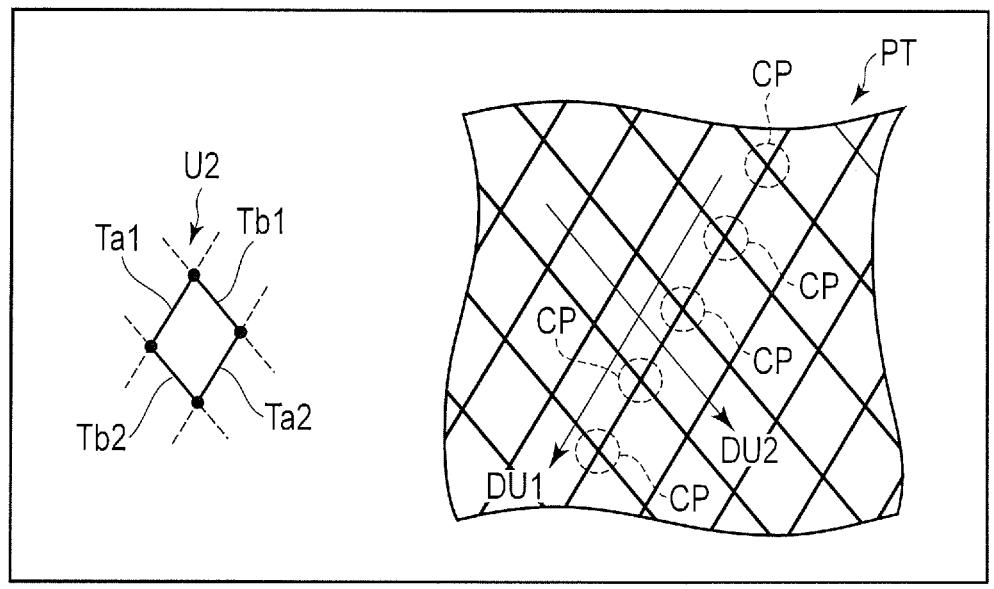
FIG. 15 is a view which schematically shows part of electrode pattern of a second embodiment.

FIG. 15 schematically shows a part of the electrode pattern PT of the second embodiment. A unit pattern U2 is shown at the left of FIG. 15. The electrode pattern PT of this example is a set of unit patterns U2 arranged along first arrangement direction DU1 and second arrangement direction DU2. Unit pattern U2 is a rhombus defined by (or closed by) line fragments Ta1, Ta2, Tb1, and Tb2.

In this electrode pattern PT, the outlines of two adjacent unit patterns U2 are formed to share a single line fragment T. For example, in the two unit patterns U2 arranged consecutively in first arrangement direction DU1, the outlines of these two unit patterns U2 are formed such that one line fragment Tb disposed at their boundary is used as line fragment Tb1 in one unit pattern U2 and is also used as line fragment Tb2 in the other unit pattern U2.

In this embodiment, elements such as tilt angle and length of line fragments Ta and Tb and arrangement directions DU1 and DU2 are defined such that, as shown in FIG. 15, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or a connection point group including connection points arranged along the diagonal of unit pattern U2 at regular intervals, or the like satisfies above conditions 1 and 2 or 3 and 4. Furthermore, such elements may be defined such that several connection point groups satisfy above conditions 1 and 2 or 3 and 4.

In the example of FIG. 15, line fragments Ta and Tb are depicted to connect with each other at an acute or obtuse angle at the connection point; however, line fragments Ta and Tb may connect with each other at a right angle.

(Third Embodiment)

Figure 16:
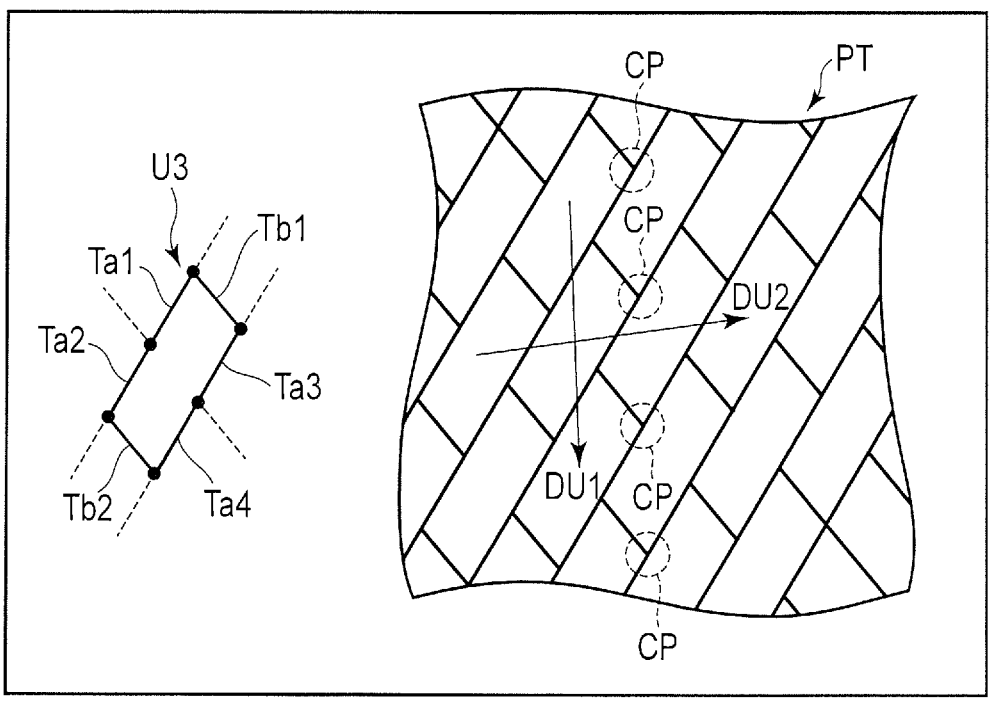
FIG. 16 is a view which schematically shows part of electrode pattern of a third embodiment.

FIG. 16 schematically shows a part of the electrode pattern PT of the third embodiment. A unit pattern U3 is shown at the left of FIG. 16. The electrode pattern PT of this example is a set of unit patterns U3 arranged along first arrangement direction DU1 and second arrangement direction DU2. Unit pattern U3 is a parallelogram defined by (or closed by) line fragments Ta1, Ta2, Ta3, Ta4, Tb1, and Tb2.

In this electrode pattern PT, the outlines of two adjacent unit patterns U3 are formed to share a single line fragment T. For example, in the two unit patterns U3 arranged consecutively in first arrangement direction DU1, the outlines of these two unit patterns U2 are formed such that one line fragment Ta disposed at their boundary is used as line fragment Ta1 in one unit pattern U3 and is also used as line fragment Ta4 in the other unit pattern U3.

In this embodiment, elements such as tilt angle and length of line fragments Ta and Tb and arrangement directions DU1 and DU2 are defined such that, as shown in FIG. 16, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or a connection point group including connection points arranged along the diagonal of unit pattern U3 at regular intervals, or the like satisfies above conditions 1 and 2 or 3 and 4. Furthermore, such elements may be defined such that several connection point groups satisfy above conditions 1 and 2 or 3 and 4.

In the example of FIG. 16, line fragments Ta and Tb are depicted to connect with each other at an acute or obtuse angle at the connection point; however, line fragments Ta and Tb may connect with each other at a right angle.

(Fourth Embodiment)

FIG. 17 schematically shows a part of the electrode pattern PT of the fourth embodiment. Unit patterns U4a and U4b are shown at the left of FIG. 17. The electrode pattern PT is a combination of unit patterns U4a and U4b. Specifically, in this electrode pattern PT, unit patterns U4a and U4b both extending in first arrangement direction DU1 are arranged alternately in second arrangement direction DU2. Unit pattern U4a is a parallelogram defined by (or closed by) line fragments Ta1, Ta2, Ta3, Ta4, Tb1, and Tb2. Unit pattern U4b is a parallelogram defined by (or closed by) line fragments Ta5, Tab, Tb3, Tb4, Tb5, and Tb6. Unit patterns U4a and U4b are symmetrical with respect to the axis along first arrangement direction DU1 and the axis along second arrangement direction DU2.

In this electrode pattern PT, the outlines of two adjacent unit patterns U4a, the outlines of two adjacent unit patterns U4b, and the outlines of adjacent unit patterns U4a and U4b are formed to share one line fragment T. For example, in the two unit patterns U4a arranged consecutively in first arrangement direction DU1, the outlines of these two unit patterns U4a are formed such that one line fragment Ta disposed at their boundary is used as line fragment Ta2 in one unit pattern U4a and is used as line fragment Ta3 in the other unit pattern U4a.

Furthermore, for example, in the two unit patterns U4b arranged consecutively in first arrangement direction DU1, the outlines of these two unit patterns U4b are formed such that one line fragment Tb disposed at their boundary is used as line fragment Tb4 in one unit pattern U4b and is also used as line fragment Tb5 in the other unit pattern U4b.

One unit pattern U4a is adjacent to four unit patterns U4b. The outline of this unit pattern U4a is formed such that its line fragments Ta1, Ta4, Tb1, and Tb2 are shared with the outlines of the four unit patterns U4b.

Furthermore, one unit pattern U4b is adjacent to four unit patterns U4a. The outline of this unit pattern U4b is formed such that its line fragments Ta5, Ta6, Tb3, and Tb6 are shared with the outlines of the four unit patterns U4a.

In this embodiment, elements such as tilt angle and length of line fragments Ta and Tb and arrangement directions DU1 and DU2 are defined such that, as shown in FIG. 17, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or a connection point group including connection points arranged along the diagonal of unit patterns U4a and U4b at regular intervals, or the like satisfies above conditions 1 and 2 or 3 and 4. Furthermore, such elements may be defined such that several connection point groups satisfy above conditions 1 and 2 or 3 and 4.

In the example of FIG. 17, line fragments Ta and Tb are depicted to connect with each other at an acute or obtuse angle at the connection point; however, line fragments Ta and Tb may connect with each other at a right angle.

(Fifth Embodiment)

FIG. 18 schematically shows a part of the electrode pattern PT of the fifth embodiment. Unit patterns U5a and U5b are shown at the left of FIG. 18. The electrode pattern PT is a combination of unit patterns U5a and U5b. Specifically, in this electrode pattern PT, unit patterns U5a and U5b both extending in first arrangement direction DU1 are arranged alternately in second arrangement direction DU2. Unit pattern U5a is a hexagon defined by (or closed by) line fragments Ta1, Ta2, Ta3, Ta4, Tb1, Tb2, Tb3, and Tb4. Unit pattern U5b is a hexagon defined by (or closed by) line fragments Ta5, Ta6, Ta7, Ta8, Tb5, Tb6, Tb7, and Tb8. Unit patterns U5a and U5b are symmetrical with respect to a predetermined axis. The interior angle formed by line fragments Ta3 and Tb2 of unit pattern U5a and the interior angle formed by line fragments Ta6 and Tb7 of unit pattern U5b are both over 180°.

In this electrode pattern PT, the outlines of two adjacent unit patterns U5a, the outlines of two adjacent unit patterns U5b, and the outlines of adjacent unit patterns U5a and U5b are formed to share one line fragment T. For example, in the two unit patterns U5a arranged consecutively in first arrangement direction DU1, the outlines of these two unit patterns U5a are formed such that one line fragment Ta disposed at their boundary is used as line fragment Ta2 in one unit pattern U5a and is used as line fragment Ta4 in the other unit pattern U5a.

Furthermore, for example, in the two unit patterns U5b arranged consecutively in first arrangement direction DU1, the outlines of these two unit patterns U5b are formed such that one line fragment Ta disposed at their boundary is used as line fragment Ta5 in one unit pattern U5b and is also used as line fragment Ta7 in the other unit pattern U5b.

One unit pattern U5a is adjacent to four unit patterns U5b. The outline of this unit pattern U5a is formed such that its line fragments Ta1, Ta3, Tb1, Tb2, Tb3, and Tb4 are shared with the outlines of the four unit patterns U5b.

Furthermore, one unit pattern U5b is adjacent to four unit patterns U5a. The outline of this unit pattern U5b is formed such that its line fragments Ta6, Ta8, Tb5, Tb6, Tb7, and Tb8 are shared with the outlines of the four unit patterns U5a.

In this embodiment, elements such as tilt angle and length of line fragments Ta and Tb and arrangement directions DU1 and DU2 are defined such that, as shown in FIG. 18, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or the like satisfies above conditions 1 and 2 or 3 and 4. Furthermore, such elements may be defined such that several connection point groups satisfy above conditions 1 and 2 or 3 and 4.

In the example of FIG. 18, line fragments Ta and Tb are depicted to connect with each other at an acute or obtuse angle at the connection point; however, line fragments Ta and Tb may connect with each other at a right angle.

(Sixth Embodiment)

Figure 19:
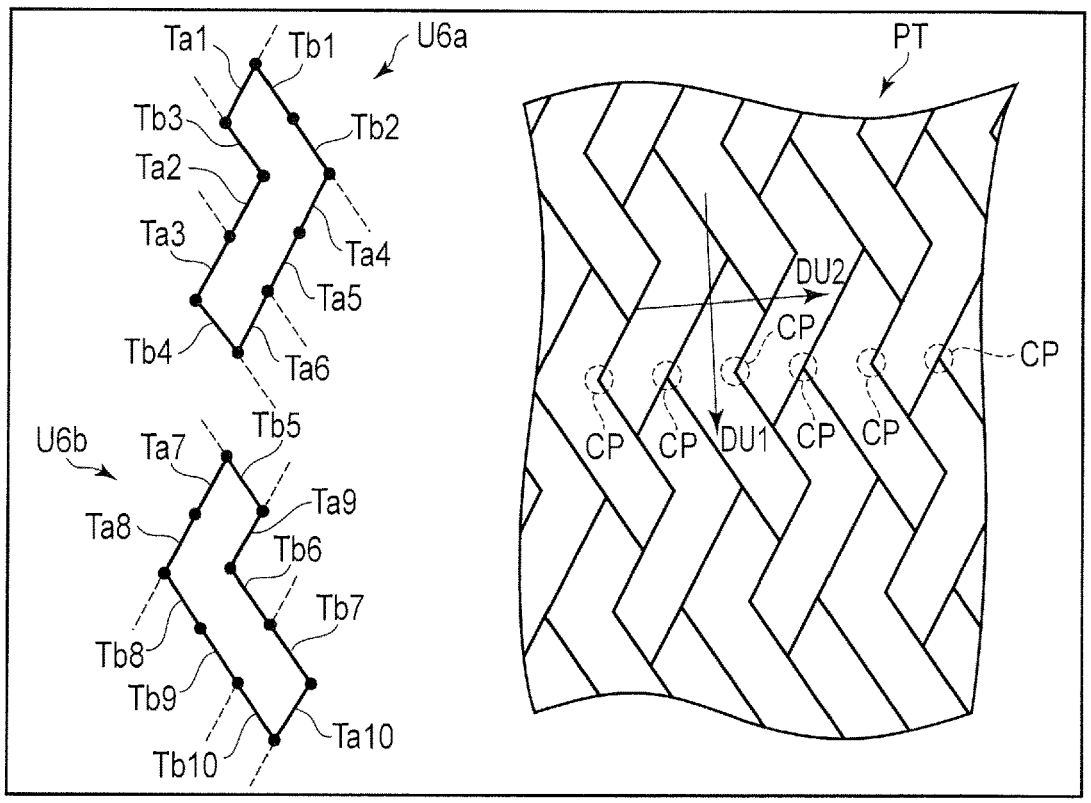
FIG. 19 is a view which schematically shows part of electrode pattern of a sixth embodiment.

FIG. 19 schematically shows a part of the electrode pattern PT of the sixth embodiment. Unit patterns U6a and U6b are shown at the left of FIG. 19. The electrode pattern PT is a combination of unit patterns U6a and U6b. Specifically, in this electrode pattern PT, unit patterns U6a and U6b both extending in first arrangement direction DU1 are arranged alternately in second arrangement direction DU2. Unit pattern U6a is a hexagon defined by (or closed by) line fragments Ta1, Ta2, Ta3, Ta4, Ta5, Ta6, Tb1, Tb2, Tb3, and Tb4. Unit pattern U6b is a hexagon defined by (or closed by) line fragments Ta1, Ta8, Ta9, Ta10, Tb5, Tb6, Tb7, Tb8, Tb9, and Tb10. Unit patterns U6a and U6b are symmetrical with respect to a predetermined axis. The interior angle formed by line fragments Ta2 and Tb3 of unit pattern U6a and the interior angle formed by line fragments Ta9 and Tb6 of unit pattern U6b are both over 180°.

In this electrode pattern PT, the outlines of two adjacent unit patterns U6a, the outlines of two adjacent unit patterns U6b, and the outlines of adjacent unit patterns U6a and U6b are formed to share one line fragment T. For example, in the two unit patterns U6a arranged consecutively in first arrangement direction DU1, the outlines of these two unit patterns U6a are formed such that one line fragment Ta disposed at their boundary is used as line fragment Ta1 in one unit pattern U6a and is used as line fragment Ta6 in the other unit pattern U6a.

Furthermore, for example, in the two unit patterns U6b arranged consecutively in first arrangement direction DU1, the outlines of these two unit patterns U6b are formed such that one line fragment Tb disposed at their boundary is used as line fragment Tb5 in one unit pattern U6b and is also used as line fragment Tb10 in the other unit pattern U6b.

One unit pattern U6a is adjacent to four unit patterns U6b. The outline of this unit pattern U6a is formed such that its line fragments Ta2, Ta3, Ta4, Ta5, Tb1, Tb2, Tb3, and Tb4 are shared with the outlines of the four unit patterns U6b.

Furthermore, one unit pattern U6b is adjacent to four unit patterns U6a. The outline of this unit pattern U6b is formed such that its line fragments Ta1, Tab, Ta9, Ta10, Tb6, Tb7, Tb8, and Tb9 are shared with the outlines of the four unit patterns U6a.

In this embodiment, elements such as tilt angle and length of line fragments Ta and Tb and arrangement directions DU1 and DU2 are defined such that, as shown in FIG. 19, the connection point group including the connection points CP arranged along second arrangement direction DU2 at regular intervals satisfies above conditions 1 and 2 or 3 and 4. However, no limitation is intended thereby, and such elements may be defined such that a connection point group including connection points arranged along first arrangement direction DU1 at regular intervals, or the like satisfies above conditions 1 and 2 or 3 and 4. Furthermore, such elements may be defined such that several connection point groups satisfy above conditions 1 and 2 or 3 and 4.

In the example of FIG. 19, line fragments Ta and Tb are depicted to connect with each other at an acute or obtuse angle at the connection point; however, line fragments Ta and Tb may connect with each other at a right angle.

(Seventh Embodiment)

Figure 20:
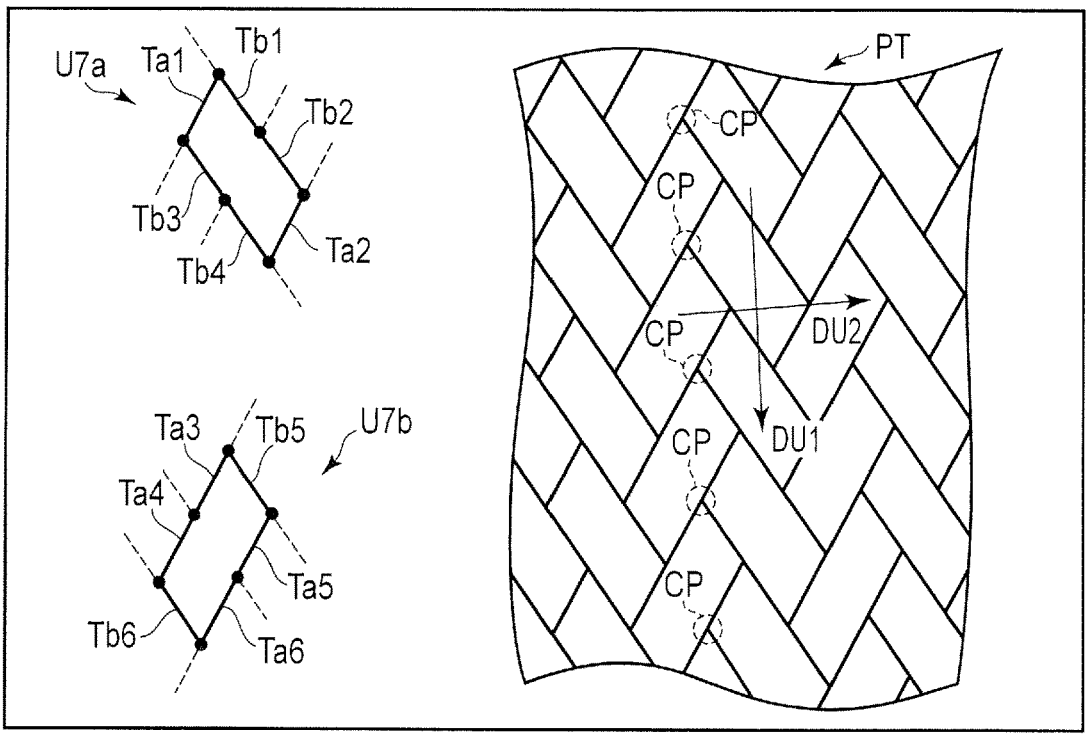
FIG. 20 is a view which schematically shows part of electrode pattern of a seventh embodiment.

FIG. 20 schematically shows a part of the electrode pattern PT of the seventh embodiment. Unit patterns U7a and U7b are shown at the left of FIG. 20. The electrode pattern PT is a combination of unit patterns U7a and U7b. Specifically, in this electrode pattern PT, unit patterns U7a and U7b both extending in first arrangement direction DU1 are arranged alternately in second arrangement direction DU2. Unit pattern U7a is a parallelogram defined by (or closed by) line fragments Ta1, Ta2, Tb1, Tb2, Tb3, and Tb4. Unit pattern U7b is a parallelogram defined by (or closed by) line fragments Ta3, Ta4, Ta5, Tab, Tb5, and Tb6. Unit patterns U7a and U7b are symmetrical with respect to the axis along first arrangement direction DU1 and the axis along second arrangement direction DU2.

In this electrode pattern PT, the outlines of two adjacent unit patterns U7a, the outlines of two adjacent unit patterns U7b, and the outlines of adjacent unit patterns U7a and U7b are formed to share one line fragment T. For example, in the two unit patterns U7a arranged consecutively in first arrangement direction DU1, the outlines of these two unit patterns U7a are formed such that one line fragment Tb disposed at their boundary is used as line fragment Tb1 in one unit pattern U7a and is used as line fragment Tb4 in the other unit pattern U7a.

Furthermore, for example, in the two unit patterns U7b arranged consecutively in first arrangement direction DU1, the outlines of these two unit patterns U7b are formed such that one line fragment Ta disposed at their boundary is used as line fragment Ta3 in one unit pattern U7b and is also used as line fragment Ta6 in the other unit pattern U7b.

One unit pattern U7a is adjacent to four unit patterns U7b. The outline of this unit pattern U7a is formed such that its line fragments Ta1, Ta2, Tb2, and Tb3 are shared with the outlines of the four unit patterns U7b.

Furthermore, one unit pattern U7b is adjacent to four unit patterns U7a. The outline of this unit pattern U7b is formed such that its line fragments Ta4, Ta5, Tb5, and Tb6 are shared with the outlines of the four unit patterns U7a.

In this embodiment, elements such as tilt angle and length of line fragments Ta and Tb and arrangement directions DU1 and DU2 are defined such that, as shown in FIG. 20, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or a connection point group including connection points arranged along the diagonal of unit patterns U7a and U7b at regular intervals, or the like satisfies above conditions 1 and 2 or 3 and 4. Furthermore, such elements may be defined such that several connection point groups satisfy above conditions 1 and 2 or 3 and 4.

In the example of FIG. 20, line fragments Ta and Tb are depicted to connect with each other at an acute or obtuse angle at the connection point; however, line fragments Ta and Tb may connect with each other at a right angle.

(Eighth Embodiment)

FIG. 21 schematically shows a part of the electrode pattern PT of the eighth embodiment. Unit pattern U8 is shown at the left of FIG. 21. The electrode pattern PT is a set of unit patterns U8 arranged in both first arrangement direction DU1 and second arrangement direction DU2. Unit pattern U8 is a dodecagon defined by (or closed by) line fragments Ta1, Ta2, Ta3, Ta4, Ta5, Ta6, Ta1, Ta8, Tb1, Tb2, Tb3, Tb4, Tb5, and Tb6. The interior angles formed by line fragments Ta3 and Tb3, line fragments Ta4 and Tb5, and line fragments Ta5 and Tb2 of unit pattern U8 are all over 180°.

In this electrode pattern PT, the outlines of two adjacent unit patterns U8 are formed to share a single line fragment T. For example, in the two unit patterns U8 arranged consecutively in first arrangement direction DU1, the outlines of these two unit patterns U8 are formed such that two line fragments Ta and one line fragment Tb disposed at their boundary are used as line fragments Ta1, Ta3, and Tb3 in one unit pattern U8 and are also used as line fragments Ta6, Ta8, and Tb4 in the other unit pattern U8.

In this embodiment, elements such as tilt angle and length of line fragments Ta and Tb and arrangement directions DU1 and DU2 are defined such that, as shown in FIG. 21, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or the like satisfies above conditions 1 and 2 or 3 and 4. Furthermore, such elements may be defined such that several connection point groups satisfy above conditions 1 and 2 or 3 and 4.

In the example of FIG. 21, line fragments Ta and Tb are depicted to connect with each other at an acute or obtuse angle at the connection point; however, line fragments Ta and Tb may connect with each other at a right angle.

(Ninth Embodiment)

FIG. 22 schematically shows a part of the electrode pattern PT of the ninth embodiment. Unit pattern U9 is shown at the left of FIG. 22. The electrode pattern PT is a set of unit patterns U9 arranged in both first arrangement direction DU1 and second arrangement direction DU2. Unit pattern U9 is a hexagon defined by (or closed by) line fragments Ta1, Ta2, Ta3, Ta4, Tb1, Tb2, Tb3, and Tb4. The interior angles formed by line fragments Ta2 and Tb2 of unit pattern U9 is over 180°.

In this electrode pattern PT, the outlines of two adjacent unit patterns U9 are formed to share a single line fragment T. For example, in the two unit patterns U9 arranged consecutively in first arrangement direction DU1, the outlines of these two unit patterns U9 are formed such that one line fragment Ta and one line fragment Tb disposed at their boundary are used as line fragments Ta2 and Tb2 in one unit pattern U9 and are also used as line fragments Ta4 and Tb4 in the other unit pattern U9.

In this embodiment, elements such as tilt angle and length of line fragments Ta and Tb and arrangement directions DU1 and DU2 are defined such that, as shown in FIG. 22, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or the like satisfies above conditions 1 and 2 or 3 and 4. Furthermore, such elements may be defined such that several connection point groups satisfy above conditions 1 and 2 or 3 and 4.

In the example of FIG. 22, line fragments Ta and Tb are depicted to connect with each other at an acute or obtuse angle at the connection point; however, line fragments Ta and Tb may connect with each other at a right angle.

(Tenth Embodiment)

FIG. 23 schematically shows a part of the electrode pattern PT of the tenth embodiment. Unit patterns U10a and U10b are shown at the left of FIG. 23. The electrode pattern PT is a combination of unit patterns U10a and U10b. Specifically, in this electrode pattern PT, unit patterns U10a and U10b both extending in first arrangement direction DU1 are arranged alternately in second arrangement direction DU2. Unit pattern U10a is a hexagon defined by (or closed by) line fragments Ta1, Ta2, Ta3, Ta4, Tb1, Tb2, Tb3, and Tb4. Unit pattern U10b is a hexagon defined by (or closed by) line fragments Ta5, Tab, Ta1, Ta8, Tb5, Tb6, Tb7, and Tb8. Unit patterns U10a and U10b are symmetrical with respect to the axis along second arrangement direction DU2. The interior angle formed by line fragments Ta2 and Tb2 of unit pattern U10a and the interior angle formed by line fragments Ta7 and Tb7 of unit pattern U10b are both over 180°.

In this electrode pattern PT, the outlines of two adjacent unit patterns U10a, the outlines of two adjacent unit patterns U10b, and the outlines of adjacent unit patterns U10a and U10b are formed to share one line fragment T. For example, in the two unit patterns U10a arranged consecutively in first arrangement direction DU1, the outlines of these two unit patterns U10a are formed such that one line fragment Ta and one line fragment Tb disposed at their boundary are used as line fragments Ta2 and Tb2 in one unit pattern U10a and are used as line fragments Ta4 and Tb4 in the other unit pattern U10a.

Furthermore, for example, in the two unit patterns U10b arranged consecutively in first arrangement direction DU1, the outlines of these two unit patterns U10b are formed such that one line fragment Ta and one line fragment Tb disposed at their boundary are used as line fragments Ta5 and Tb5 in one unit pattern U10b and are also used as line fragments Ta7 and Tb7 in the other unit pattern U10b.

One unit pattern U10a is adjacent to four unit patterns U10b. The outline of this unit pattern U10a is formed such that its line fragments Ta1, Ta3, Tb1, and Tb3 are shared with the outlines of the four unit patterns U10b.

Furthermore, one unit pattern U10b is adjacent to four unit patterns U10a. The outline of this unit pattern U10b is formed such that its line fragments Tab, Tab, Tb6, and Tb8 are shared with the outlines of the four unit patterns U10a.

In this embodiment, elements such as tilt angle and length of line fragments Ta and Tb and arrangement directions DU1 and DU2 are defined such that, as shown in FIG. 23, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or the like satisfies above conditions 1 and 2 or 3 and 4. Furthermore, such elements may be defined such that several connection point groups satisfy above conditions 1 and 2 or 3 and 4.

In the example of FIG. 23, line fragments Ta and Tb are depicted to connect with each other at an acute or obtuse angle at the connection point; however, line fragments Ta and Tb may connect with each other at a right angle.

(Eleventh Embodiment)

FIG. 24 schematically shows a part of the electrode pattern PT of the eleventh embodiment. Unit patterns U11a and U11b are shown at the left of FIG. 24. The electrode pattern PT is a combination of unit patterns U11a and U11b. Specifically, in this electrode pattern PT, unit patterns U11a and U11b are arranged alternately in first arrangement direction DU1 and second arrangement direction DU2.

Unit patterns U11a and U11b are composed of line fragments Ta and Tb, and in addition thereto, line fragment Tc which is tilted at an angle different from those of line fragments Ta and Tb. Specifically, unit pattern U11a is a triangle defined by (or closed by) line fragments Ta1, Tb1, and Tc1. Unit pattern U11b is a triangle defined by (or closed by) line fragments Ta2, Tb2, and Tc2. Unit patterns U11a and U11b are symmetrical with respect to an axis along first arrangement direction DU1 and an axis along second arrangement direction DU2.

In this electrode pattern PT, the outlines of adjacent unit patterns U11a and U11b are formed to share one line fragment T. For example, in the adjacent unit patterns U11a and U11b arranged consecutively in first arrangement direction DU1, the outlines of these two unit patterns U11a and U11b are formed such that one line fragment Tc disposed at their boundary is used as line fragment Tc1 in unit pattern U11a and is used as line fragment Tc2 in unit pattern U11b.

In this embodiment, elements such as tilt angle and length of line fragments Ta, Tb, and Tc and arrangement directions DU1 and DU2 are defined such that, as shown in FIG. 24, the connection point group including the connection points CP arranged along second arrangement direction DU2 at regular intervals satisfies above conditions 1 and 2 or 3 and 4. However, no limitation is intended thereby, and such elements may be defined such that a connection point group including connection points arranged along first arrangement direction DU1 at regular intervals, or the like satisfies above conditions 1 and 2 or 3 and 4. Furthermore, such elements may be defined such that several connection point groups satisfy above conditions 1 and 2 or 3 and 4.

In the example of FIG. 24, line fragments Ta, Tb, and Tc are depicted to connect with each other at an acute or obtuse angle at the connection point; however, line fragments Ta and Tb, line fragments Ta and Tc, or line fragments Tb and Tc may connect with each other at a right angle.

(Twelfth Embodiment)

Figure 25:
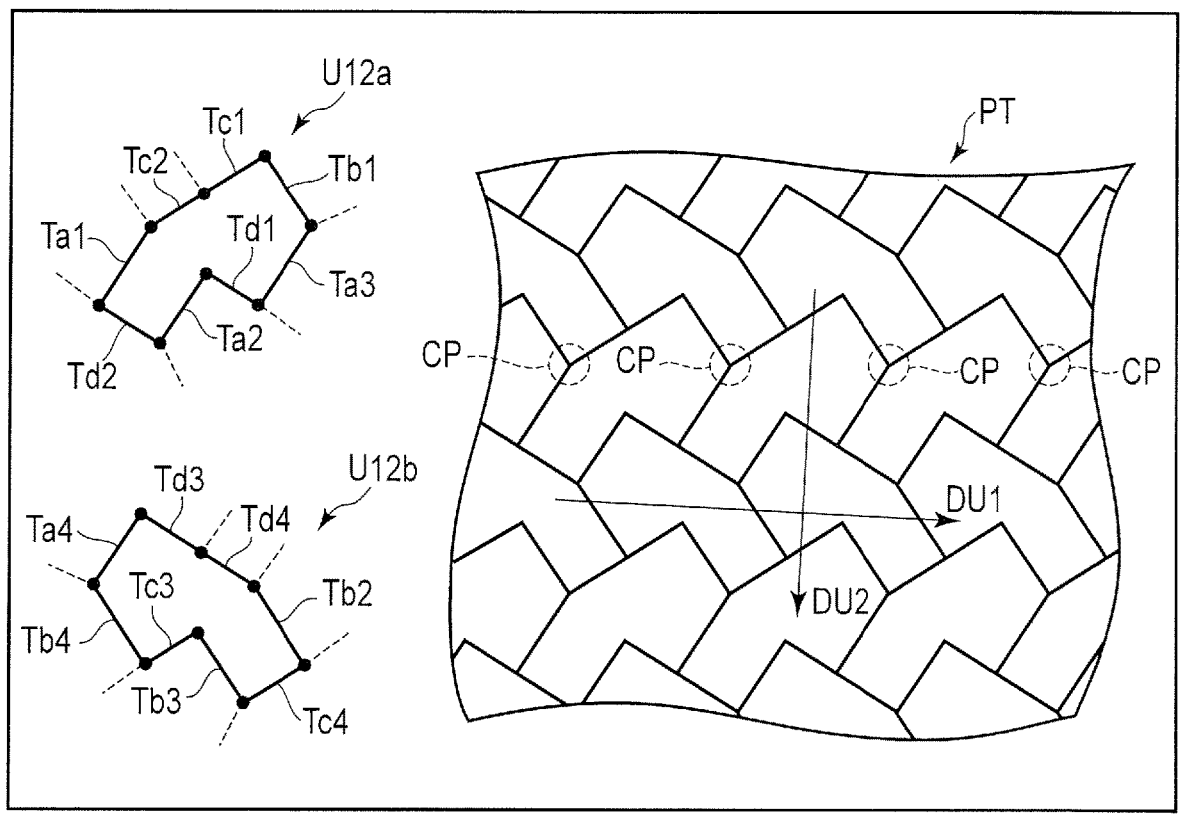
FIG. 25 is a view which schematically shows part of electrode pattern of a twelfth embodiment.

FIG. 25 schematically shows a part of the electrode pattern PT of the twelfth embodiment. Unit patterns U12a and U12b are shown at the left of FIG. 25. The electrode pattern PT is a combination of unit patterns U12a and U12b. Specifically, in this electrode pattern PT, unit patterns U12a and U12b both extending in first arrangement direction DU1 are arranged alternately in second arrangement direction DU2.

Unit patterns U12a and U12b are composed of line fragments Ta and Tb, and in addition thereto, line fragments Tc and Td. Thin fragments Ta, Tb, Tc, and Td are tilted at different angles. Unit pattern U12a is a septagon defined by (or closed by) line fragments Ta1, Ta2, Ta3, Tb1, Tc1, Tc2, Td1, and Td2. Unit pattern U12b is a septagon defined by (or closed by) line fragments Ta4, Tb2, Tb3, Tb4, Tc3, Tc4, Td3, and Td4. Unit patterns U12a and U12b are symmetrical with respect to an axis along second arrangement direction DU2. The interior angle formed by line fragments Ta2 and Td1 of unit pattern U12a and the interior angle formed by line fragments Tb3 and Tc3 of unit pattern U12b are both over 180°.

In this electrode pattern PT, the outlines of two adjacent unit patterns U12a, the outlines of two adjacent unit patterns U12b, and the outlines of adjacent unit patterns U12a and U12b are formed to share at least one line fragment T. For example, in the two unit patterns U12a arranged consecutively in first arrangement direction DU1, the outlines of these two unit patterns U12a are formed such that one line fragment Ta disposed at their boundary is used as line fragment Ta1 in one unit pattern U12a and is used as line fragment Ta3 in the other unit pattern U12a.

Furthermore, for example, in the two unit patterns U12b arranged consecutively in first arrangement direction DU1, the outlines of these two unit patterns U12b are formed such that one line fragment Tb disposed at their boundary is used as line fragment Tb2 in one unit pattern U12b and is also used as line fragment Tb4 in the other unit pattern U12b.

One unit pattern U12a is adjacent to four unit patterns U12b. The outline of this unit pattern U12a is formed such that its line fragments Ta2, Tb1, Tc1, Tc2, Td1 and Td2 are shared with the outlines of the four unit patterns U12b.

Furthermore, one unit pattern U12b is adjacent to four unit patterns U12a. The outline of this unit pattern U12b is formed such that its line fragments Ta4, Tb3, Tc3, Tc4, Td3, and Td4 are shared with the outlines of the four unit patterns U12a.

In this embodiment, elements such as tilt angle and length of line fragments Ta, Tb, Tc, and Td and arrangement directions DU1 and DU2 are defined such that, as shown in FIG. 25, the connection point group including the connection points CP arranged along first arrangement direction DU1 at regular intervals satisfies above conditions 1 and 2 or 3 and 4. However, no limitation is intended thereby, and such elements may be defined such that a connection point group including connection points arranged along second arrangement direction DU2 at regular intervals, or the like satisfies above conditions 1 and 2 or 3 and 4. Furthermore, such elements may be defined such that several connection point groups satisfy above conditions 1 and 2 or 3 and 4.

(Thirteenth Embodiment)

Figure 26:
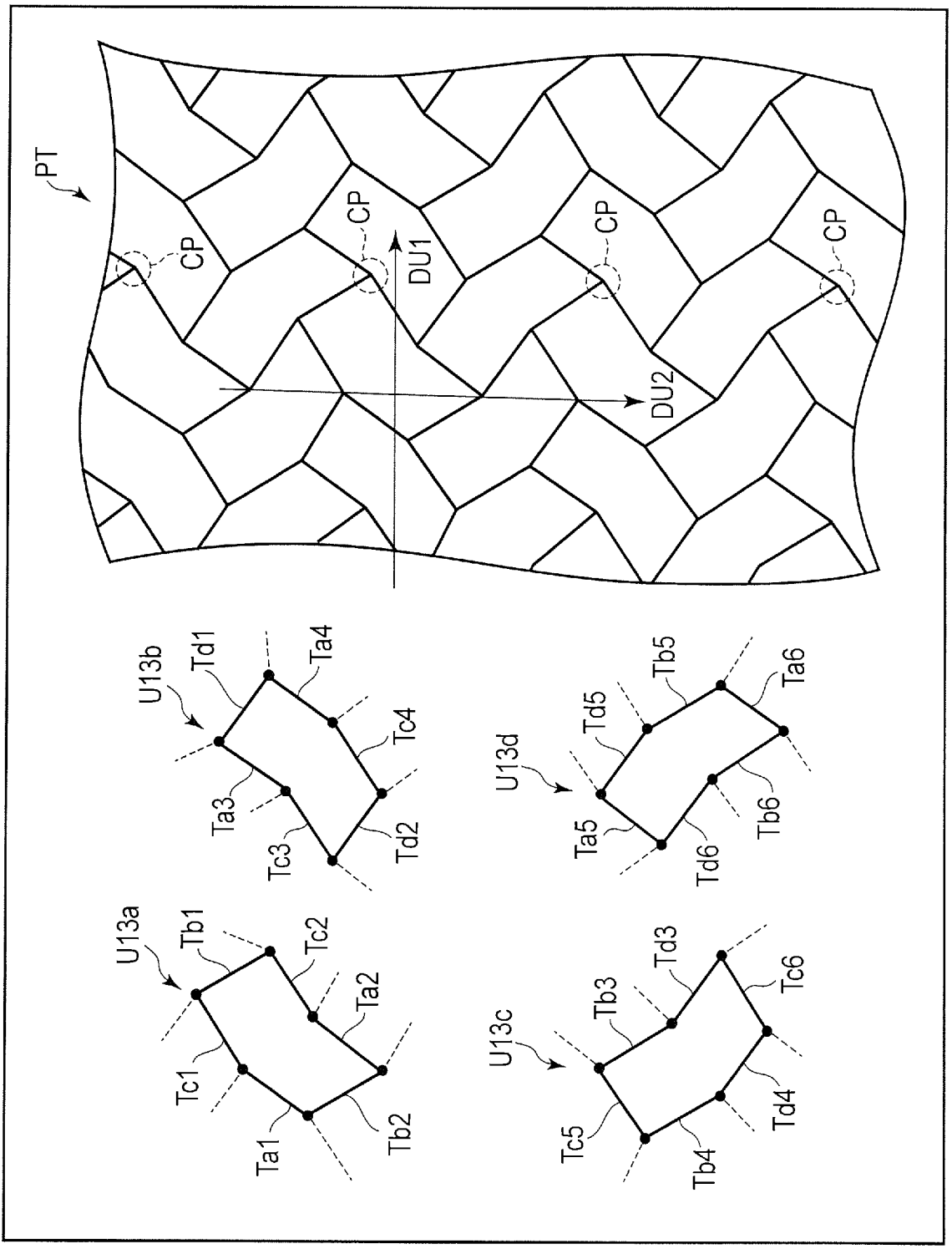
FIG. 26 is a view which schematically shows part of electrode pattern of a thirteenth embodiment.

FIG. 25 schematically shows a part of the electrode pattern PT of the thirteenth embodiment. Unit patterns U13a, U13b, U13c, and U13d are shown at the left of FIG. 26. The electrode pattern PT is a combination of unit patterns U13*a*, U13*b*, U13*c*, and U13*d*. Specifically, in this electrode pattern PT, unit patterns U13*a* and U13*b* extending in first arrangement direction DU1 and unit patterns U13*c* and U13*d* extending in first arrangement direction DU1 are arranged alternately in second arrangement direction DU2.

Unit patterns U13*a*, U13*b*, U13*c*, and U13*d* are composed of line fragments Ta and Tb, and in addition thereto, line fragments Tc and Td. Thin fragments Ta, Tb, Tc, and Td are tilted at different angles. Unit pattern U13*a* is a hexagon defined by (or closed by) line fragments Ta1, Ta2, Tb1, Tb2, Tc1, and Tc2. Unit pattern U13*b* is a hexagon defined by (or closed by) line fragments Ta3, Ta4, Tc3, Tc4, Td1, and Td2. Unit pattern U13*c* is a hexagon defined by (or closed by) line fragments Tb3, Tb4, Tc5, Tc6, Td3, and Td4. Unit pattern U13*d* is a hexagon defined by (or closed by) line fragments Ta5, Ta6, Tb5, Tb6, Td5, and Td6. Unit patterns U13*a* and U13*b*, unit patterns U13*c* and U13*d*, unit patterns U13*a* and U13*d*, and unit patterns U13*b* and U13*c* are symmetrical with respect to a predetermined axis. The interior angle formed by line fragments Ta2 and Tc2 of unit pattern 13*a*, the interior angle formed by line fragments Ta3 and Tc3 of unit pattern U13*b*, the interior angle formed by line fragments Tb3 and Td3 of unit pattern U13*c*, and the interior angle formed by line fragments Tb6 and Td6 of unit pattern U13*d* are all over 180°.

In this electrode pattern PT, unit patterns U13*a*, U13*b*, U13*c*, and U13*d* do not adjoin a unit pattern of the same kind. The outlines of two adjacent unit patterns are formed to share at least one line fragment T. For example, in unit patterns U13*a* and U13*b* arranged consecutively in first arrangement direction DU1, the outlines of these unit patterns U13*a* and U13*b* are formed such that one line fragment Tc disposed at their boundary is used as line fragment Tc2 in unit pattern U13*a* and is used as line fragment Tc3 in unit pattern U13*b*. Or, the outlines of these unit patterns U13*a* and U13*b* may be formed such that one line fragment Ta disposed at their boundary is used as line fragment Ta1 in unit pattern U13*a* and is used as line fragment Ta4 in unit pattern U13*b*.

Furthermore, for example, in unit patterns U13*c* and U13*d* arranged consecutively in first arrangement direction DU1, the outlines of these unit patterns U13*c* and U13*d* are formed such that one line fragment Td disposed at their boundary is used as line fragment Td3 in unit pattern U13*c* and is used as line fragment Td6 in unit pattern U13*d*. Or, the outlines of these unit patterns U13*c* and U13*d* may be formed such that one line fragment Tb disposed at their boundary is used as line fragment Tb4 in unit pattern U13*c* and is used as line fragment Tb5 in unit pattern U13*d*.

Furthermore, for example, in unit patterns U13*a* and U13*c* arranged consecutively in second arrangement direction DU2, the outlines of these unit patterns U13*a* and U13*c* are formed such that one line fragment Tc disposed at their boundary is used as line fragment Tc1 in unit pattern U13*a* and is used as line fragment Tc6 in unit pattern U13*c*. Or, the outlines of these unit patterns U13*a* and U13*c* may be formed such that one line fragment Tb disposed at their boundary is used as line fragment Tb2 in unit pattern U13*a* and is used as line fragment Tb3 in unit pattern U13*c*.

Furthermore, for example, in unit patterns U13*a* and U13*d* arranged consecutively in second arrangement direction DU2, the outlines of these unit patterns U13*a* and U13*d* are formed such that one line fragment Ta disposed at their boundary is used as line fragment Ta2 in unit pattern U13*a* and is used as line fragment Ta5 in unit pattern U13*d*. Or, the outlines of these unit patterns U13*a* and U13*d* may be formed such that one line fragment Tb disposed at their boundary is used as line fragment Tb1 in unit pattern U13*a* and is used as line fragment Tb6 in unit pattern U13*d*.

Furthermore, for example, in unit patterns U13*b* and U13*c* arranged consecutively in second arrangement direction DU2, the outlines of these unit patterns U13*b* and U13*c* are formed such that one line fragment Td disposed at their boundary is used as line fragment Td1 in unit pattern U13*b* and is used as line fragment Td4 in unit pattern U13*c*. Or, the outlines of these unit patterns U13*b* and U13*c* may be formed such that one line fragment Tc disposed at their boundary is used as line fragment Tc4 in unit pattern U13*b* and is used as line fragment Tc5 in unit pattern U13*c*.

Furthermore, for example, in unit patterns U13*b* and U13*d* arranged consecutively in second arrangement direction DU2, the outlines of these unit patterns U13*b* and U13*d* are formed such that one line fragment Ta disposed at their boundary is used as line fragment Ta3 in unit pattern U13*b* and is used as line fragment Ta6 in unit pattern U13*d*. Or, the outlines of these unit patterns U13*b* and U13*d* may be formed such that one line fragment Td disposed at their boundary is used as line fragment Td2 in unit pattern U13*b* and is used as line fragment Td5 in unit pattern U13*d*.

In this embodiment, various unit patterns are composed of various line fragments T and the electrode pattern PT is composed of these various unit patterns. Consequently, aligning connections points linearly is difficult in this embodiment. In the liquid crystal display device DSP with this electrode pattern PT, moiré due to the interference between the display area DA and the electrode pattern PT can be prevented or suppressed.

In this embodiment, as shown in FIG. 26, the electrode pattern PT includes connection point group aligned linearly. Thus, if elements such as tilt angle and length of line fragments Ta, Tb, Tc, and Td and arrangement directions DU1 and DU2 are defined such that the connection point group satisfies above conditions 1 and 2 or 3 and 4, better prevention or suppression of moiré can be expected.

As in the first to thirteenth embodiments explained above, the electrode pattern PT composed of unit patterns U arranged two-dimensionally includes a plurality of connection points groups aligned at regular intervals along the arrangement direction of the unit patterns U. Therefore, if any one of the connection point groups can satisfy above conditions 1 and 2 or 3 and 4, other connection point groups parallel to this connection point group with the same intervals can satisfy above conditions 1 and 2 or 3 and 4 as well.

In the first to thirteenth embodiments, the same patterns used as the electrode patterns PT of the embodiments can be applied to the dummy electrodes DR. In that case, the pattern formed of dummy electrodes DR may be designed such that ends of line fragments included in the dummy electrodes DR do not contact with each other to have the dummy electrodes DR in an electrically floating state.

As in the second to thirteenth embodiments, since the electrode pattern PT is composed of the unit patterns U defined by (or closed by) line fragments T and adjacent unit patterns U therein share at least one line fragment T, the detection electrodes Rx does not break easily. That is, in such an electrode pattern PT, even if a break occurs at one point between adjacent unit patterns U, an electrical connection in the line fragments T adjacent to this break point can be maintained by other routes. Therefore, the second to thirteenth embodiments can increase the reliability of sensing function of the liquid crystal display device DSP.

As in the fourth to seventh and tenth to thirteenth embodiments, since the electrode pattern PT is composed of various kinds of unit patterns U, and as particularly in the fifth, sixth, eighth to tenth, twelfth, and thirteenth embodiments, since the electrode pattern PT is composed of unit patterns U having a polygonal outline including at least one interior angle exceeding 180°, the electrode pattern PT is complex and the detection performance of the sensor SE can be maintained good. That is, if an area in which the common electrode CE and line fragments T are not opposed to each other spreads widely over the detection surface, approach of a finger of a user may not be detected therein. On the other hand, if the electrode pattern PT is complex as in the above, such an area spreading widely can be reduced and the detection performance of the sensor SE can be maintained good.

The embodiments explained above can be varied arbitrarily. Some examples of variations are described hereinafter.

(Variation 1)

Pixel arrangements within the display area DA are not limited to those shown in FIGS. 11 and 12. In this variation, another pixel arrangement within the display area DA is explained with reference to FIG. 27. In the display area DA of FIG. 27, red subpixel SPXR, green subpixel SPXG, and blue subpixel SPXB are arranged in a matrix extending in direction X and direction Y. Subpixels SPXR, SPXG, and SPXB are arranged such that the subpixels of the same color do not continue in either direction X or direction Y. A unit pixel PX is composed of subpixels SPXR and SPXG arranged side by side in direction X and a subpixel SPXB below the subpixel SPXR.

Amongst red, green, and blue, green has the maximum luminosity for the eye, and the arrangement direction of green subpixels SPXG is defined as first direction D1 (pixel arrangement direction) in this display area DA. Therefore, first direction D1 crosses both direction X and direction Y as depicted in the figure. Furthermore, a direction orthogonal to first direction D1 is second direction D2.

If the subpixels SPXR, SPXG, and SPXB are formed in the same rectangular shape in this variation, first pixel pitch pa1 of the unit pixel PX in first direction D1 corresponds to a diagonal length of a single subpixel SPX. Furthermore, second pixel pitch pa2 of the unit pixel PX in second direction D2 corresponds to twice the diagonal length of a single subpixel SPX. The same advantages obtained in the above embodiments can be achieved in a case where the display area DA as in this variation is used.

(Variation 2)

In this variation, another pixel arrangement within the display area DA is explained with reference to FIG. 28. In the display area DA of FIG. 28, red subpixel SPXR, green subpixel SPXG, blue subpixel SPXB, and white subpixel SPXW are arranged in a matrix extending in direction X and direction Y. The display area DA includes two kinds of unit pixels PX1 and PX2. Unit pixel PX1 is composed of subpixels SPXR, SPXG, and SPXB arranged in direction X. Unit pixel PX2 is composed of subpixels SPXR, SPXG, and SPXB arranged in direction X. Unit pixels PX1 and PX2 are arranged alternately in direction X. Furthermore, unit pixels PX1 and PX2 are arranged alternately in direction Y.

Amongst red, green, blue, and white, white has the maximum luminosity for the eye, and in this display area DA, white subpixel SPXW does not continue in any direction. In that case, first direction D1 (pixel arrangement direction) can be defined based on an average luminosity of a combination of subpixels. For example, in the line of subpixels SPXW and SPXB arranged alternately in direction Y, if an average luminosity thereof is greater than the luminosity of other subpixel lines, a direction parallel to direction Y can be defined as first direction D1. Accordingly, a direction orthogonal to first direction D1, that is, a direction parallel to direction X can be defined as second direction D2. In the example depicted, unit pixels PX1 and PX2 have the same first pixel pitch pa1 in first direction D1. Furthermore, unit pixels PX1 and PX2 have the same second pixel pitch pa2 in second direction D2. The same advantages obtained in the above embodiments can be achieved in a case where the display area DA as in this variation is used.

Based on the structures which have been described in the above-described embodiment and variations, a person having ordinary skill in the art may achieve structures with arbitral design changes; however, as long as they fall within the scope and spirit of the present invention, such structures are encompassed by the scope of the present invention. For example, the electrode patterns PT only including a part designed based on the technical concept of the above-described embodiment and variations should be acknowledged made within the scope of the invention, and actual products with minor differences and design changes caused by their production process should never be acknowledged beyond the scope of the invention.

Furthermore, regarding the present embodiments, any advantage and effect those will be obvious from the description of the specification or arbitrarily conceived by a skilled person are naturally considered achievable by the present invention.

Some examples of a sensor-equipped display device obtained from the embodiments are described below.

[1] A sensor-equipped display device, comprising:

a display panel including a display area in which unit pixels are arranged with a first pixel pitch in a first direction and a second pixel pitch in a second direction, each of the unit pixels including a plurality of subpixels corresponding to different colors; and a detection electrode including an electrode pattern having conductive line fragments arranged on a detection surface which is parallel to the display area, the detection electrodes configured to detect a contact or approach of an object to the detection surface, wherein the electrode pattern has a plurality of connection points at which ends of the line fragments are connected to each other, and at least part of the connection points is arranged linearly such that an arrangement gap thereof in the first direction is set to a first connection point pitch and an arrangement gap thereof in the second direction is set to a second connection point pitch, the first connection point pitch is defined to exclude a range from 0.5×first pixel pitch×(integer−0.05) to 0.5×first pixel pitch×(integer+0.05), and the second connection point pitch is defined to exclude a range from 0.5×second pixel pitch×(integer−0.05) to 0.5×second pixel pitch×(integer+0.05).

[2] The sensor-equipped display device according to the example [1], wherein the first connection point pitch is defined to exclude a range from 0.5×first pixel pitch x (integer−0.1) to 0.5×first pixel pitch×(integer+0.1), and the second connection point pitch is defined to exclude a range from 0.5×second pixel pitch×(integer−0.1) to 0.5×second pixel pitch×(integer+0.1).

[3] The sensor-equipped display device according to the example [1], wherein the electrode pattern includes first line fragment and second line fragment which are tilted at different angles with respect to the first direction, the first and second line fragments arranged alternately while being connected to an adjacent fragment at ends thereof, and the connection points arranged linearly are connection points to connect an end of the first line fragment to an end of the second line fragment.

[4] The sensor-equipped display device according to the example [1], wherein the electrode pattern includes a plurality of unit patterns of which outlines are closed by the line fragments, and the outlines of adjacent unit patterns share at least one line fragment.

[5] The sensor-equipped display device according to the example [1], wherein the electrode pattern includes different kinds of unit patterns of which outlines are closed by the line fragments respectively, and the outlines of the different kinds of unit patterns have different shapes.

[6] The sensor-equipped display device according to the example [1], wherein the electrode pattern includes a plurality of unit patterns each having a polygonal shaped outline in which at least one interior angle is greater than 180°.

[7] The sensor-equipped display device according to the example [1], comprising a driving electrode configured to form a capacitance between the detection electrode and thereof; and a detection circuit configured to detect a contact or approach of an object to the detection surface based on a change in the capacitance, wherein the line fragment includes a metal material, and the driving electrode includes a transmissive material and is disposed in a layer different from the detection electrode in a normal direction of the display area to be opposed to the detection electrode with a dielectric intervening therebetween.

[8] The sensor equipped display device according to the example [1], wherein the display panel comprises a common electrode forming a capacitance between the detection electrode and thereof, and a pixel electrode provided with each subpixel to be opposed to the common electrode with an insulating film intervening therebetween, and the display panel further comprises a detection circuit configured to detect a contact or approach of an object to the detection surface based on a change in the capacitance, and a driving circuit configured to supply a first driving signal for driving the subpixels and a second driving signal for forming the capacitance used by the detection circuit to detect a contact or approach of an object to the detection surface, selectively, to the common electrode.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is as follows:

1. A sensor device, comprising:
a detection electrode including an electrode pattern having conductive line fragments arranged on a detection surface, the detection electrode configured to detect a contact or approach of an object to the detection surface; and
a driving electrode configured to form a capacitance between the detection electrode and the driving electrode, wherein each of the line fragments includes a metal material that blocks light, the driving electrode is formed of a transparent conductive material that is different from the metal material, the driving electrode is disposed in a layer different from the detection electrode in a normal direction of the detection surface to be opposed to the detection electrode with a dielectric intervening between the detection electrode and the driving electrode, the electrode pattern has a plurality of connection points at which ends of the line fragments are connected to each other, and at least part of the connection points is arranged linearly such that an arrangement gap thereof in a first direction is set to a first connection point pitch and an arrangement gap thereof in a second direction is set to a second connection point pitch, the first direction being different from the second direction, a plurality of unit color potions, which include at least a red color portion, a green color portion, and a blue color portion, are defined with a first unit pitch in the first direction and a second unit pitch in the second direction, the first connection point pitch is defined to exclude a range from 0.5×first unit pitch×(integer−0.05) to 0.5× first unit pitch×(integer +0.05), and the second connection point pitch is defined to exclude a range from 0.5×second unit pitch ×(integer−0.05) to 0.5×second unit pitch×(integer +0.05).

2. The sensor device according to claim 1, wherein
the first connection point pitch is defined to exclude a range from 0.5×first unit pitch×(integer−0.1) to 0.5× first unit pitch×(integer +0.1), and
the second connection point pitch is defined to exclude a range from 0.5×second unit pitch×(integer−0.1) to 0.5× second unit pitch×(integer +0.1).

3. The sensor device according to claim 1, wherein
the electrode pattern includes a first line fragment and a second line fragment which are tilted at different angles with respect to the first direction, the first and second line fragments arranged alternately while being connected to an adjacent fragment at ends thereof, and
the connection points arranged linearly are connection points to connect an end of the first line fragment to an end of the second line fragment.

4. The sensor device according to claim 1, wherein
the electrode pattern includes a plurality of unit patterns of which outlines are closed by the line fragments, and
the outlines of adjacent unit patterns share at least one line fragment.

5. The sensor device according to claim 1, wherein
the electrode pattern includes different kinds of unit patterns of which outlines are closed by the line fragments respectively, and
the outlines of the different kinds of unit patterns have different shapes.

6. The sensor device according to claim 1, wherein
the electrode pattern includes a plurality of unit patterns each having a polygonal shaped outline in which at least one interior angle is greater than 180°.

7. The sensor device according to claim 1, comprising
a detection circuit configured to detect a contact or approach of an object to the detection surface based on a change in the capacitance.

8. The sensor device according to claim 1, further comprising:
a common electrode forming a capacitance between the detection electrode and thereof, and a detection circuit configured to detect a contact or approach of an object to the detection surface based on a change in the capacitance.

9. The sensor device according to claim 1, wherein
the driving electrode includes a plurality of divisional electrodes, and
the divisional electrodes are extended substantially linearly in the second direction.

10. A sensor-equipped display device, comprising:
a display panel including a display area in which unit color portions are arranged with a first unit pitch in a first direction and a second unit pitch in a second direction;
a detection electrode including an electrode pattern having conductive line fragments arranged on a detection surface which is parallel to the display area, the detection electrode configured to detect a contact or approach of an object to the detection surface; and
a driving electrode configured to form a capacitance between the detection electrode and the driving electrode, wherein
each of the line fragments includes a metal material that blocks light,
the driving electrode is formed of a transparent conductive material that is different from the metal material,
the driving electrode is disposed in a layer different from the detection electrode in a normal direction of the display area to be opposed to the detection electrode with a dielectric intervening between the detection electrode and the driving electrode,
the electrode pattern has a plurality of connection points at which ends of the line fragments are connected to each other, and at least part of the connection points is arranged linearly such that an arrangement gap thereof in the first direction is set to a first connection point pitch and an arrangement gap thereof in the second direction is set to a second connection point pitch,
the first connection point pitch is defined to exclude a range from 0.5×first unit pitch×(integer−0.05) to 0.5×first unit pitch×(integer +0.05), and
the second connection point pitch is defined to exclude a range from 0.5×second unit pitch×(integer−0.05) to 0.5×second unit pitch×(integer +0.05).

11. The sensor-equipped display device according to claim 10, wherein
the first connection point pitch is defined to exclude a range from 0.5×first unit pitch×(integer−0.1) to 0.5×first unit pitch×(integer +0.1), and
the second connection point pitch is defined to exclude a range from 0.5×second unit pitch×(integer−0.1) to 0.5×second unit pitch×(integer+0.1).

12. The sensor-equipped display device according to claim 10, wherein
the electrode pattern includes first line fragment and second line fragment which are tilted at different angles with respect to the first direction, the first and second line fragments arranged alternately while being connected to an adjacent fragment at ends thereof, and
the connection points arranged linearly are connection points to connect an end of the first line fragment to an end of the second line fragment.

13. The sensor-equipped display device according to claim 10, wherein
the electrode pattern includes a plurality of unit patterns of which outlines are closed by the line fragments, and
the outlines of adjacent unit patterns share at least one line fragment.

14. The sensor-equipped display device according to claim 10, wherein
the electrode pattern includes different kinds of unit patterns of which outlines are closed by the line fragments respectively, and
the outlines of the different kinds of unit patterns have different shapes.

15. The sensor-equipped display device according to claim 10, wherein
the electrode pattern includes a plurality of unit patterns each having a polygonal shaped outline in which at least one interior angle is greater than 180°.

16. The sensor-equipped display device according to claim 10, comprising
a detection circuit configured to detect a contact or approach of an object to the detection surface based on a change in the capacitance.

17. The sensor-equipped display device according to claim 10, wherein the display panel comprises a common electrode forming a capacitance between the detection electrode and thereof, and
the display panel further comprises a detection circuit configured to detect a contact or approach of an object to the detection surface based on a change in the capacitance, and a driving circuit configured to supply a first driving signal for driving the color portions and a second driving signal for forming the capacitance used by the detection circuit to detect a contact or approach of an object to the detection surface, selectively, to the common electrode.

18. The sensor-equipped display device according to claim 10, wherein
the driving electrode includes a plurality of divisional electrodes, and
the divisional electrodes are extended substantially linearly in the second direction.

\* \* \* \* \*